(12) United States Patent
Rubin et al.

(10) Patent No.: US 11,870,319 B2
(45) Date of Patent: *Jan. 9, 2024

(54) ELECTRIC MOTOR

(71) Applicant: Tau Motors, Inc., Redwood City, CA (US)

(72) Inventors: Matthew J. Rubin, Indianapolis, IN (US); Walter Wesley Pennington, III, Menlo Park, CA (US); Adam Daniel Ambrecht, Kennesaw, GA (US); Gregory Gordon Stevenson, San Carlos, CA (US)

(73) Assignee: Tau Motors, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/882,135

(22) Filed: Aug. 5, 2022

(65) Prior Publication Data
US 2022/0376597 A1 Nov. 24, 2022

Related U.S. Application Data

(63) Continuation of application No. 16/963,950, filed as application No. PCT/US2019/033811 on May 23, 2019, now Pat. No. 11,451,124.
(Continued)

(51) Int. Cl.
*H02K 41/06* (2006.01)
*H02K 9/193* (2006.01)
*H02K 7/116* (2006.01)

(52) U.S. Cl.
CPC .......... *H02K 41/065* (2013.01); *H02K 7/116* (2013.01); *H02K 9/193* (2013.01)

(58) Field of Classification Search
CPC ....... H02K 41/065; H02K 7/116; H02K 9/193
See application file for complete search history.

(56) References Cited

U.S. PATENT DOCUMENTS

| 3,249,776 A | 5/1966 | Anderson et al. |
| 3,294,994 A | 12/1966 | Anderson |

(Continued)

FOREIGN PATENT DOCUMENTS

| DE | 2135929 | 12/1972 |
| DE | 102005061188 | 7/2007 |

(Continued)

OTHER PUBLICATIONS

EP Extended Search Report in European Appln. No. 19806841.3, dated Jun. 1, 2021, 12 pages.
(Continued)

*Primary Examiner* — Dang D Le
(74) *Attorney, Agent, or Firm* — Fish & Richardson P.C.

(57) ABSTRACT

An electric motor has a stator mechanically coupled to the rotor by a nutating traction interface, such that during nutation of the rotor with respect to the stator a tilt axis of the rotor progresses about the axis of rotation of the output shaft. The rotor and a surface of the stator bound a dynamic gap across which a magnetic field is produced by electrical activation of the motor to generate a force between the rotor and the stator. The traction interface and the gap are arranged such that, in a plane containing the axis of rotation of the output shaft, the traction interface is angled with respect to the stator surface bounding the gap. The rotor is connected to the output shaft by a tiltable connection such as a gimbal.

20 Claims, 27 Drawing Sheets

Related U.S. Application Data

(60) Provisional application No. 62/675,207, filed on May 23, 2018.

(56) References Cited

U.S. PATENT DOCUMENTS

| | | | |
|---|---|---|---|
| 3,322,984 | A | 5/1967 | Anderson |
| 3,341,725 | A | 9/1967 | Gifford |
| 3,452,227 | A | 6/1969 | Welch |
| 3,456,139 | A | 7/1969 | Newell |
| 3,530,322 | A | 9/1970 | Newell |
| 3,585,426 | A | 6/1971 | Newell |
| 3,794,865 | A * | 2/1974 | Guttinger ............... F16H 35/18 310/82 |
| 4,329,607 | A * | 5/1982 | Rosain ............... H02K 41/065 310/82 |
| 4,906,881 | A * | 3/1990 | Knight ............... H02K 41/065 310/82 |
| 5,309,041 | A | 5/1994 | Kawai et al. |
| 5,804,898 | A | 9/1998 | Kawai |
| 5,832,675 | A | 11/1998 | Zuares |
| 6,371,137 | B1 * | 4/2002 | Heath ............... B01F 25/2125 134/169 R |
| 6,401,401 | B1 | 6/2002 | Williams |
| 9,404,489 | B1 | 8/2016 | Atmur et al. |
| 10,404,135 | B2 | 9/2019 | Rubin |
| 11,451,124 | B2 * | 9/2022 | Rubin ............... H02K 41/065 |
| 2018/0034355 | A1 | 2/2018 | Peck, Jr. et al. |
| 2021/0384811 | A1 | 12/2021 | Rubin et al. |

FOREIGN PATENT DOCUMENTS

| | | |
|---|---|---|
| DE | 102009002587 | 10/2010 |
| DE | 102014001263 | 6/2017 |
| FR | 85038 | 5/1965 |
| JP | S61-022752 | 1/1986 |
| JP | H02-104782 | 8/1990 |
| JP | 2004-353780 | 12/2004 |
| JP | 2015-142454 | 8/2015 |
| WO | WO 00/70729 | 11/2000 |

OTHER PUBLICATIONS

PCT International Preliminary Report on Patentability in International Appln. No. PCT/US2019/033811, dated Dec. 3, 2020, 6 pages.
PCT International Search Report and Written Opinion in International Application No. PCT/US2019/033811, dated Aug. 1, 2019, 7 pages.
Office Action in Australian Appln. No. 2019272884, dated Sep. 6, 2022, 4 pages.
Office Action in European Appln. No. 19806841.3, dated Apr. 21, 2023, 13 pages.
Office Action in Japanese Appln. No. 2021-516542, dated Mar. 28, 2023, 19 pages (with English translation).
Office Action in Japanese Appln. No. 2021-516542, dated Aug. 18, 2023, 7 pages (with English translation).
Office Action in Chinese Appln. No. 201980047346.8, dated Oct. 11, 2023, 24 pages (with English translation).

* cited by examiner

ELECTRIC MOTOR

CROSS REFERENCE TO RELATED APPLICATIONS

This application is a Continuation of U.S. patent application Ser. No. 16/963,950, filed Jul. 22, 2020 which is a U.S. National Phase application under 35 U.S.C. § 371 of International Patent Application No. PCT/US2019/033811, filed on May 23, 2019, which claims the priority of U.S. Provisional No. 62/675,207, filed May 23, 2018, the disclosures of which are incorporated herein by reference in their entirety.

TECHNICAL FIELD

This invention relates to electric motors and the operation of such motors.

BACKGROUND

One of the ways in which electric motors may be characterized is by their torque density (i.e., achievable torque per unit of motor volume). For many applications in which particularly high torque density is necessary, hydraulic motors have found more practical use, as achieving high torque densities with electric motors has been challenging. A conventional motor has a stator with electromagnetic elements, and a rotor that rotates about a central axis of rotation with respect to the stator. The stator and/or the rotor is electrically activated to produce a tangential magnetic force that generates a torque. In addition to the tangential force, electric motors also produce a normal force between the stator and the rotor (sometimes referred to as radial pressure) resulting from the magnetic fields, which can be an order of magnitude larger than the tangential force. In typical motors the radial pressure is carefully balanced across the rotor to prevent stator-rotor collisions. Some have attempted to harness the normal force by using a rotor that moves in an eccentric motion.

There is a need for new motor designs that at least partially harness radial pressure to generate torque with acceptably smooth power transmission.

SUMMARY

One aspect of the invention features an electric motor with an output shaft defining an axis of rotation, a rotor rotationally coupled to the output shaft, and a stator mechanically coupled to the rotor by a nutating traction interface, such that during nutation of the rotor with respect to the stator a tilt axis of the rotor progresses about the axis of rotation of the output shaft. The rotor and a surface of the stator bound a dynamic gap across which a magnetic field is produced by electrical activation of the motor to generate a force between the rotor and the stator. The traction interface and the gap are arranged such that, in a plane containing the axis of rotation of the output shaft, the traction interface is angled with respect to the stator surface bounding the gap.

In some embodiments, the rotor is a first rotor, the stator is a first stator, and the nutating traction interface is a first nutating traction interface. The motor also includes a second rotor rotationally coupled to the output shaft, and a second stator mechanically coupled to the second rotor by a second nutating traction interface, such that during nutation of the second rotor with respect to the second stator a tilt axis of the second rotor progresses to define a conical surface with respect to the axis of rotation of the output shaft. The second rotor and a surface of the second stator bound a gap across which a magnetic field is produced by electrical activation of the motor to generate a force between the second rotor and the second stator.

In some examples, the first and second rotors are coupled to the output shaft such that during motor operation the first and second rotor axes tilt in opposite directions with respect to the axis of rotation of the output shaft.

In some cases, a progressing engagement point of the first nutating traction interface is rotationally aligned with a progressing engagement point of the second nutating traction interface with respect to the first stator.

The first and second rotors may be disposed axially between the first and second nutating traction interfaces, or the first and second nutating traction interfaces may be disposed between the first and second rotors.

In some motors, the rotor is rotationally coupled to the output shaft by a gimbal defining two independent tilt axes perpendicular to each other and to the axis of rotation of the output shaft.

In some examples the stator surface is cylindrical. In such cases, the rotor surface may be frustoconical.

In many embodiments the dynamic air gap is a radial air gap. By "radial" air gap we mean an air gap between stator and rotor along an active magnetic flux path, in which the path of least reluctance across the gap is more radial than axial or tangential, with respect to an axis of rotation of the rotor. The air gap is dynamic in that it changes dimensionally from point to point around the rotor and over time, due to the rotor nutation.

In some configurations, the stator has stator poles with associated windings, and the radial air gap is radially inboard of the stator poles. Preferably, at any point during nutation a point of maximum traction engagement of the traction interface and a point of minimum dynamic air gap are disposed on opposite sides of the axis of rotation.

In some other configurations, the stator has stator poles with associated windings, and the radial air gap is radially outboard of the stator poles. Preferably, at any point during nutation, a point of maximum traction engagement of the traction interface is disposed on a same side of the output shaft as an instantaneous point of minimum dynamic air gap.

In some embodiments the traction interface features a series of rotor gear teeth meshed with a series of stator gear teeth. In some cases, the series of rotor gear teeth comprises more gear teeth than the series of stator gear teeth. Preferably, there is a difference of one tooth between total numbers of gear teeth of the series of rotor gear teeth and the series of stator gear teeth, such that one nutation of the nutating traction interface changes a rotational position of the rotor with respect to the stator by a circumferential pitch of one tooth spacing.

In some cases, the traction interface also features a tapered edge surface of the rotor arranged to roll against a tapered stop surface of the stator during nutation.

In some configurations, the stator includes a stator end cap supporting a bearing that supports the output shaft, and the stator end cap features the stator gear teeth.

In some examples, the traction interface features a compliant friction surface in rolling engagement with a reaction surface under a normal load.

In some configurations, the traction interface is radially outboard of the dynamic air gap. In other configurations, the traction interface is radially inboard of the dynamic air gap.

In some embodiments, the stator has multiple independently activatable windings spaced apart circumferentially about the rotor. The windings are sequentially activatable in advance of a progressing engagement point of the nutating traction interface to motivate rotation of the rotor. The motor may also include a winding controller with a set of switches operable to activate the windings of the stator.

In some configurations, multiple adjacent windings of the stator are activatable simultaneously as a winding set, the stator including multiple such multi-winding sets spaced about the stator.

In some embodiments, the stator has circumferentially spaced-apart poles associated with stator windings. The poles may be formed by an axial stack of laminations. Preferably, the laminations are formed to have a remanence of at least 100 gauss at the rotor for at least one minute after opening all stator windings. Such a remanence can help to maintain rotor position after stator de-energization, for example.

In some cases, the nutating traction interface is configured to rotationally advance the rotor with respect to the stator by a distance approximately equal to stator pole pitch.

In some embodiments, the traction interface features a traction surface of the rotor engaged with a stationary traction surface of the stator, with the traction surface of the stator defining a stator pitch cone with a stator pitch cone angle of between 4 and 40 degrees. In some cases the traction surface of the rotor defines a rotor pitch cone with a rotor pitch cone angle differing from the stator pitch cone angle by less than 10 degrees, preferably less than 7.5 degrees, more preferably less than 5 degrees.

In some constructions, the rotor is disposed within the stator, such as between stator poles. In some other cases, the rotor extends around poles of the stator.

In some examples, the rotor has radially-extending, circumferentially spaced-apart teeth with distal end surfaces that bound the dynamic air gap. The distal end surfaces may be directed radially outward toward poles of the stator, or directed radially inward toward poles of the stator.

In some cases, the stator has circumferentially spaced-apart poles associated with stator windings. In some examples, each of the spaced-apart teeth features multiple tooth projections spaced apart axially, and each stator pole features multiple pole projections spaced apart axially. Preferably, the tooth projections and pole projections are axially aligned at a point of smallest dynamic air gap.

The rotor, in some embodiments, has multiple laminations of ferromagnetic material adjacent the air gap.

In some cases, the nutating traction interface is lubricated. For example, the motor may contain flowable lubricant directed into the nutating traction interface by a lubrication system. The motor, in some configurations, includes an active lubrication system with a pump that causes a flow of lubricant to be directed to the nutating traction interface during motor operation. In some configurations, the output shaft defines a lubrication port arranged to direct flowable lubricant to the traction interface. The lubrication port may be, for example, in fluid communication with a lubrication channel defined by a gimbal on which the rotor is mounted.

Some motor configurations have a lubrication rail with at least one nozzle arranged to spray lubricant from the rail for lubricating the traction interface.

Another aspect of the invention features an electric motor with an output shaft defining an axis of rotation, a rotor coupled to the output shaft at a tiltable connection, and a stator disposed adjacent the rotor to define a dynamic air gap. The stator has multiple windings, each configured to generate a magnetic field to draw a respective side of the rotor toward the stator, to cause the rotor to nutate with respect to the stator in response to sequential activations of the multiple windings, progressively tilting the tiltable connection. The tiltable connection features a gimbal arranged to transmit torque from the rotor to the output shaft.

In some embodiments, the rotor is a first rotor, the stator is a first stator, the dynamic air gap is a first dynamic air gap and the tiltable connection is a first tiltable connection. The motor also includes a second rotor rotationally coupled to the output shaft, and a second stator mechanically coupled to the second rotor by a second tiltable connection featuring a second gimbal arranged to transmit torque from the second rotor to the output shaft. The second rotor and a surface of the second stator bound a second dynamic air gap across which a magnetic field is produced by electrical activation of the motor to generate a force between the second rotor and the second stator.

In some cases, the first and second rotors are coupled to the output shaft such that during motor operation the first and second rotor axes tilt in opposite directions with respect to the axis of rotation of the output shaft.

In some arrangements, a progressing minimum position of the first dynamic air gap is rotationally aligned with a progressing minimum position of the second dynamic air gap, with respect to the first stator.

In some examples, the first stator is mechanically coupled to the first rotor by a first nutating traction interface, and the second stator is mechanically coupled to the second rotor by a second nutating traction interface, such that during nutation of the rotors with respect to the stators a respective tilt axis of each rotor progresses about the axis of rotation of the output shaft. The first and second rotors may be disposed axially between the first and second nutating traction interfaces, or the first and second nutating traction interfaces are disposed between the first and second rotors, for example.

In some cases, the stator surface is cylindrical. The rotor surface may be frustoconical.

In some motors, the dynamic air gap is a radial air gap. In some cases, the stator features stator poles associated with the stator windings, and the radial air gap is radially inboard of the stator poles. The stator may be mechanically coupled to the rotor by a nutating traction interface, configured such that at any point during nutation, a point of maximum traction engagement of the traction interface and a point of minimum dynamic air gap are disposed on opposite sides of the axis of rotation. In some other cases, the stator features stator poles associated with the stator windings, and the radial air gap is radially outboard of the stator poles. The stator may be mechanically coupled to the rotor by a nutating traction interface, configured such that at any point during nutation, a point of maximum traction engagement of the traction interface is disposed on a same side of the output shaft as an instantaneous point of minimum dynamic air gap.

In some embodiments, the stator is mechanically coupled to the rotor by a nutating traction interface featuring a series of rotor gear teeth meshed with a series of stator gear teeth. In some cases, the series of rotor gear teeth comprises more gear teeth than the series of stator gear teeth. Preferably, there is a difference of one tooth between total numbers of gear teeth of the series of rotor gear teeth and the series of stator gear teeth, such that one nutation of the nutating traction interface changes a rotational position of the rotor with respect to the stator by a circumferential pitch of one tooth spacing.

In some configurations, the traction interface also features a tapered edge surface of the rotor arranged to roll against a tapered stop surface of the stator during nutation.

Some examples of the stator include a stator end cap supporting a bearing that supports the output shaft, with the stator end cap featuring the stator gear teeth.

The traction interface may be radially outboard of the dynamic air gap, or radially inboard of the dynamic air gap, as examples.

In some arrangements, the stator is mechanically coupled to the rotor by a nutating traction interface featuring a compliant friction surface in rolling engagement with a reaction surface under a normal load.

In some embodiments, multiple adjacent windings of the stator are activatable simultaneously as a winding set, the stator comprising multiple such multi-winding sets spaced about the stator.

In some examples, the stator has circumferentially spaced-apart poles associated with respective stator windings. The poles may be formed by an axial stack of laminations.

In some embodiments, the stator is mechanically coupled to the rotor by a nutating traction interface featuring a traction surface of the rotor engaged with a stationary traction surface of the stator, with the traction surface of the stator defining a stator pitch cone with a stator pitch cone angle of between 4 and 40 degrees. Preferably, the traction surface of the rotor defines a rotor pitch cone with a rotor pitch cone angle differing from the stator pitch cone angle by less than 10 degrees, more preferably less than 7.5 degrees, even more preferably less than 5 degrees.

In some cases, the rotor features radially-extending, circumferentially spaced-apart teeth with distal end surfaces that bound the dynamic air gap. The distal end surfaces may be directed radially outward toward poles of the stator, or radially inward toward poles of the stator, for example. In some configurations in which the stator features circumferentially spaced-apart poles associated with the stator windings, each of the spaced-apart teeth has multiple tooth projections spaced apart axially, and each stator pole has multiple pole projections spaced apart axially. Preferably, the tooth projections and pole projections are axially aligned at a point of smallest dynamic air gap.

In some examples, the rotor features multiple laminations of ferromagnetic material adjacent the air gap.

In some embodiments, the stator is mechanically coupled to the rotor by a nutating traction interface, and the nutating traction interface is lubricated by an active lubrication system including a pump that causes a flow of lubricant to be directed to the nutating traction interface during motor operation. In some examples, the output shaft defines a lubrication port arranged to direct a flowable lubricant to the traction interface. The lubrication port may be in fluid communication with a lubrication channel defined by the gimbal, for example. In some configurations, the motor includes a lubrication rail with at least one nozzle arranged to spray lubricant from the rail for lubricating the traction interface.

Another aspect of the invention features an electric motor having an output shaft defining an axis of rotation, a rotor coupled to the output shaft at a tiltable connection, and a stator disposed adjacent the rotor to define a dynamic air gap. The stator has multiple windings, each configured to generate a magnetic field to draw a respective side of the rotor toward the stator, to cause the rotor to nutate with respect to the stator in response to sequential activations of the multiple windings, progressively tilting the tiltable connection. The dynamic air gap is bounded by an outer circumferential surface of the rotor, such that magnetic coupling between the rotor and stator is principally radial.

In some examples, the outer circumferential surface of the rotor is tapered.

In some embodiments, the rotor is a first rotor, the stator is a first stator, the dynamic air gap is a first dynamic air gap and the tiltable connection is a first tiltable connection, the motor also featuring a second rotor rotationally coupled to the output shaft, and a second stator mechanically coupled to the second rotor by a second tiltable connection. The second rotor and a surface of the second stator bound a second dynamic air gap across which a magnetic field is produced by electrical activation of the motor to generate a force between the second rotor and the second stator.

In some configurations, the first and second rotors are coupled to the output shaft such that during motor operation the first and second rotor axes tilt in opposite directions with respect to the axis of rotation of the output shaft.

Preferably, a progressing minimum position of the first dynamic air gap is rotationally aligned with a progressing minimum position of the second dynamic air gap, with respect to the first stator.

In some embodiments, the first stator is mechanically coupled to the first rotor by a first nutating traction interface, and the second stator is mechanically coupled to the second rotor by a second nutating traction interface, such that during nutation of the rotors with respect to the stators a respective tilt axis of each rotor progresses about the axis of rotation of the output shaft. The first and second rotors may be disposed axially between the first and second nutating traction interfaces, or the first and second nutating traction interfaces may be disposed between the first and second rotors, for example.

In some examples in which the stator comprises stator poles associated with the stator windings, the radial air gap is radially inboard of the stator poles. In cases where the stator is mechanically coupled to the rotor by a nutating traction interface, preferably a point of maximum traction engagement of the traction interface and a point of minimum dynamic air gap are disposed on opposite sides of the axis of rotation, at any point during nutation.

In some other examples in which the stator comprises stator poles associated with the stator windings, the radial air gap is radially outboard of the stator poles. In cases in which the stator is mechanically coupled to the rotor by a nutating traction interface, preferably a point of maximum traction engagement of the traction interface is disposed on a same side of the output shaft as an instantaneous point of minimum dynamic air gap, at any point during nutation.

In some embodiments, the stator is mechanically coupled to the rotor by a nutating traction interface featuring a series of rotor gear teeth meshed with a series of stator gear teeth. In some cases, the series of rotor gear teeth comprises more gear teeth than the series of stator gear teeth. Preferably there is a difference of one tooth between total numbers of gear teeth of the series of rotor gear teeth and the series of stator gear teeth, such that one nutation of the nutating traction interface changes a rotational position of the rotor with respect to the stator by a circumferential pitch of one tooth spacing.

In some examples, the traction interface also features a tapered edge surface of the rotor arranged to roll against a tapered stop surface of the stator during nutation. In some cases, the stator has a stator end cap supporting a bearing that supports the output shaft, and the stator end cap features the stator gear teeth. The traction interface may be radially outboard of the dynamic air gap, or radially inboard of the dynamic air gap, for example.

In some configurations, the stator is mechanically coupled to the rotor by a nutating traction interface comprising a compliant friction surface in rolling engagement with a reaction surface under a normal load.

In some motors, multiple adjacent windings of the stator are activatable simultaneously as a winding set, the stator featuring multiple such multi-winding sets spaced about the stator.

In some embodiments in which the stator is mechanically coupled to the rotor by a nutating traction interface featuring a traction surface of the rotor engaged with a stationary traction surface of the stator, the traction surface of the stator defines a stator pitch cone with a stator pitch cone angle of between 4 and 40 degrees. Preferably, the traction surface of the rotor defines a rotor pitch cone with a rotor pitch cone angle differing from the stator pitch cone angle by less than 10 degrees, more preferably less than 7.5 degrees, even more preferably less than 5 degrees.

In some arrangements, the rotor is disposed within the stator.

In some configurations, the rotor features radially-extending, circumferentially spaced-apart teeth with distal end surfaces that bound the dynamic air gap. The distal end surfaces may be directed radially outward toward poles of the stator, or radially inward toward poles of the stator, for example. In some cases in which the stator features circumferentially spaced-apart poles associated with the stator windings, each of the spaced-apart teeth has multiple tooth projections spaced apart axially, and each stator pole has multiple pole projections spaced apart axially. Preferably, a the tooth projections and pole projections are axially aligned at a point of smallest dynamic air gap.

In some cases, the rotor has multiple laminations of ferromagnetic material adjacent the air gap.

In some configurations in which the stator is mechanically coupled to the rotor by a nutating traction interface, the nutating traction interface is lubricated by an active lubrication system including a pump that causes a flow of lubricant to be directed to the nutating traction interface during motor operation. In some examples, the output shaft defines a lubrication port arranged to direct a flowable lubricant to the traction interface. The motor may include a lubrication rail with at least one nozzle arranged to spray lubricant from the rail for lubricating the traction interface.

In some examples, the rotor is rotationally coupled to the output shaft by a gimbal defining two independent tilt axes perpendicular to each other and to the axis of rotation of the output shaft.

Yet another aspect of the invention features a method of operating an electric motor. The method includes activating a first coil of a stator disposed adjacent a rotor to define a dynamic air gap bounded by an outer circumferential surface of the rotor, such that magnetic coupling between the rotor and stator is principally radial, the rotor coupled to an output shaft of the motor at a tiltable connection. The method also includes activating a second coil of the stator, the second coil spaced circumferentially from the first coil, and then activating a third coil of the stator, the third coil spaced circumferentially from both the first and second coils, with the second coil disposed between the first and third coils. Sequential activation of the first, second and third coils causes the rotor to nutate about the output shaft axis and thereby to turn the output shaft.

In some examples, the rotor is a first rotor, the stator is a first stator, the dynamic air gap is a first dynamic air gap and the tiltable connection is a first tiltable connection, the motor also featuring a second rotor rotationally coupled to the output shaft, and a second stator mechanically coupled to the second rotor by a second tiltable connection. The method includes sequentially activating coils of the second stator to cause the second rotor to nutate about the output shaft axis, the first and second rotors transferring cumulative torque.

In some cases, the first and second rotors are coupled to the output shaft such that during motor operation the first and second rotor axes tilt in opposite directions with respect to the axis of rotation of the output shaft.

In some examples, the second rotor and second stator together define a second dynamic air gap, and during motor operation a progressing minimum position of the first dynamic air gap is rotationally aligned with a progressing minimum position of the second dynamic air gap, with respect to the first stator.

In some cases, the first stator is mechanically coupled to the first rotor by a first nutating traction interface, and the second stator is mechanically coupled to the second rotor by a second nutating traction interface, such that during nutation of the rotors with respect to the stators a respective tilt axis of each rotor progresses about an axis of rotation of the output shaft.

In some examples, each of the sequentially activated coils of the second stator is activated together with a respective coil of the first stator.

In some cases, the first, second and third coils of the first stator, and the sequentially activated coils of the second stator together form simultaneously-activated pairs of coils, each pair featuring both a coil of the first stator and a coil of the second stator circumferentially aligned with the coil of the first stator.

In some cases, activating the first coil of the stator includes simultaneously activating multiple, circumferentially adjacent windings of the stator as a winding set not including the second coil or the third coil.

In some examples in which the stator is mechanically coupled to the rotor by a nutating traction interface, the method also includes directing a flowable lubricant to the nutating traction interface during motor operation. Directing the flowable lubricant may include causing the lubricant to flow through a lubrication port of the output shaft, and/or spraying the lubricant from a nozzle of a lubrication rail within the motor.

As used herein, the term "electric motor" refers to electric motors and electric generators.

According to another aspect of the invention, an electric motor includes an orbiting assembly with a first traction component located along a mechanical operational interface and operationally connected to a first magnetic component located along a magnetic operational interface. The motor also has a gimbal assembly with a plurality of gimbal rings connected via bearings about a rotational axis operationally connecting the orbiting assembly to an output shaft located along a central axis of rotation, resulting in a rotational degree of freedom. The motor also has a stationary assembly with a second traction component also located along a mechanical operational interface, operationally connected to a second magnetic component also located along the magnetic operational interface. The mechanical operational and magnetic operational interfaces are between different surfaces At least one magnetic component features a plurality of poles. A related circuit is configured to electromagnetically activate the poles in a predetermined sequence. Electromagnetic activation results in an eccentric magnetic force between the first and second magnetic components, causing the orbiting assembly to eccentrically translate with respect to the stationary assembly about a virtual pivot point defined by the gimbal assembly. Compression (attractive force)

between the first and second magnetic components is translated into tangential thrust via mechanical communication of the first traction component and second traction component and communicated to the output shaft via the gimbal assembly.

In some cases the traction component of the orbiting assembly is directly coupled to its magnetic component. For example, the traction component may feature a gear directly mounted to a set of rotor laminations. Or it may be indirectly coupled to the magnetic component via a support plate. The support plate may provide a low mass structurally rigid and geometrically consistent alignment between the orbiting magnetic component, its related traction component, and the gimbal assembly. Such a support plate may be manufactured by conventional techniques from structurally suitable materials such as steel alloys, carbon fiber composites, or aluminum alloys. In some applications it may be structurally beneficial to incorporate the traction component into the support plate as a single component. The support plate may also directly couple to the gimbal assembly to transfer torque while maintaining structural alignment. While the support plate may comprise a separate component that may be operationally coupled to a gimbal ring, in some applications it may be beneficial to incorporate a gimbal ring directly into the support plate, resulting in a single component.

The components of the orbiting assembly may be assembled using conventional techniques such as fastening, welding, adhesive bonding, and mechanical interference bonding to achieve a desired structural rigidity and durability. The support plate may be coupled to the gimbal assembly using similar techniques, or in the case of a support plate that serves as a gimbal ring, the support plate may be operationally coupled to a second gimbal ring via a rotational bearing interface.

The traction component may be a high friction flexible material, such as rubber or urethane, a rigid frictional interface, such as a gear or traction rail, or may combine elements from multiple structures, such as a gear coupled to a drive rail or a rubber o-ring coupled to a drive rail. A drive rail may define the travel limit of the orbiting rotor with respect to the stator to provide consistent operation. A geared traction component may have an involute or cycloidal tooth profile, be straight cut or helical cut, be concave, convex, bevel cut, or some combination thereof. The stator and the rotor are each coupled to a traction component such that operation of the motor results in the engagement along a rolling conical interface.

The motor may include one or more bearings coupling the output shaft and a stator housing. Such a bearing may be a plain, fluid, or rolling element bearing that may support a radial load, axial load, or combination thereof. A shaft bearing may also be a plurality of radial and thrust bearings to support a combination of radial and axial loads. Tapered roller bearings or angular contact bearings are preferred for automotive applications given the anticipated shaft loads. Bearings may be permanently lubricated or require active lubrication.

One or both of the magnetic components may include a solid ferromagnetic material, such as iron, iron alloy, iron oxide, alnico, or ferrite, a laminated ferromagnetic material, such as laminated electrical steel, iron-cobalt steel, or amorphous alloys, or a solid composite material, such as powder metal core or sintered magnetic composites, or may feature a combination of such materials. The ferromagnetic material of the stator core may have a low remanence and be considered magnetically soft, such as electrical core iron, sintered magnetic composite, or soft ferrite, or have a high remanence and be considered magnetically hard, such as alnico or hard ferrite. Soft core materials may enable efficient, rapid sequential excitation of stator poles with relatively low hysteresis loss, while hard core materials may enable fixed positional stability of the rotor in the absence of pole excitation. These materials may be patterned using conventional methods, such as machining, die stamping, laser cutting, or compression molding, and may be assembled as needed using conventional methods, such as welding, crimping, fastening, or adhesive bonding.

A rotor core may be a ferromagnetic material arranged such that it provides a complementary external magnetic surface that may facilitate magnetic communication with a stator under excitation. The rotor may be substantially uniform or may have slots that enable magnetic communication while allowing for interference with respect to the maximum radius of the rotor and the minimum radius of the stator. Alternatively the external surface may be substantially uniform. The surface may also be taper ground in such a way that enables a constant minimum air gap across the height of the rotor core during operation.

The gimbal assembly preferably provides a low friction torque transferring mechanism between the rotor core and the output shaft. The gimbal assembly may have gimbal bearings in the form of single rolling element bearing, double one way rolling element bearings, or fluid or solid lubricated journal bearings. Double rolling element bearings, such as a unidirectional needle bearing, may be used to even the wear of bearing surfaces during operation.

The stator may include a stator core secured to a stator housing, such that the stator core is maintained stationary during operation, a plurality of stator teeth forming a flux path with the stator core, such that excitation of a pole increases the magnetic field intensity within the stator core, and a housing traction plate coupled to the stator core either by direct mechanical connection or indirectly through the stator housing. The stator teeth may protrude from a stator yoke, or back iron, thereby creating stator slots. The housing traction plate may also be used to support mechanical alignment between the orbiting rotor and the stator. The stator core may comprise one continuous material or a series of discrete components. While a continuous material may provide greater dimensional consistency, a series of discrete stator poles maintained in mechanical alignment by the stator housing may enable efficient manufacturing and assembly.

The stator may be internal or external, or both internal and external. Multiple stator-rotor pole sets may be arranged concentrically with respect to each other such that force resulting from electromagnetic excitation of the multiple concentric, or nested, rotor poles is transferred to a single gimbal assembly during operation.

The stator poles enable electromagnetic communication between the power electronics and stator core, while provided electrical isolation. Stator poles may include an electrical conductive coil of wire, such as insulated or enameled magnet wire, or a plurality of welded electrically conductive bars, such as insulated copper bars. The stator housing provides structural support to the stator core during operation. The stator housing may be a direct mechanical extension of the stator core or may be a separate component.

The motor may be powered by a power electronic assembly controlled using conventional power electronic switches, which may be wired in parallel drives to balance relative speed between two rotors in a dual rotor configuration by using parallel inductive load reactors.

The magnetic air gap of the motor is not consistent about the circumference of the rotor core. In the motors described below, the core materials must maintain a non-zero air gap to prevent catastrophic damage resulting from "walling" due to complex three dimensional orbiting motion of the rotor core relative to the stator core. The air gap changes throughout the motor's operation and the point of interaction may vary across the plane of the distance between the stator and rotor. However a preferred minimum air gap may be, for example, 0.05 to 2.0 millimeter, more preferably 0.5 to 1.5 millimeter, and even more preferably 0.75 to 1 millimeters. It should be understood that an air gap may be filled with another fluid other than air.

Mechanical contact surfaces of the motor may be passively lubricated using conventional liquid lubricants, such as gear oil, semi solid lubricants, such as grease, dry lubricants, such as graphite or MoS2, or self-lubricating surfaces, such as nylon or oil impregnated metal.

Active lubrication may enable greater power density by providing a medium to absorb heat from electrical coils and mechanical contact surfaces. An active lubrication system may be used to provide intermittent or continuous lubrication of surface by circulating a fluid lubricant through the motor. For example, a fluid pump may mechanically promote a lubricant to flow from the fluid pump to the motor via fluid lines, where it may be discharged via directional nozzles to provide active lubrication and/or fluid cooling to specific locations within the motor. Fluid may then gravitationally collect in an oil pan at the base of the motor and flow via a return fluid line back to the pump for recirculation. In this way, a motor rotor assembly may operate in a lubricated, non-submerged environment. In addition, a portion of the lubricant may pass through a heat exchanger to add or remove heat from the lubricant in order to modulate the temperature and/or viscosity of the lubricant to meet the specific needs of an application.

A lubricant may be any conventional fluid used for lubricating mechanical contact surfaces. At operating conditions the lubricant may be a low viscosity fluid in the range of 1 to 500 centipoise, such as motor oil, a medium viscosity fluid in the range of 500 to 2,000 centipoise, such as gear oil, or a high viscosity semi-fluid in the range above 2,000 centipoise, such as grease. A lubricant may also be an aqueous fluid that may or may not contain lubricious material, such as sulphate functionalized graphene.

The motor may include a collection pan to gravitationally collect the lubricant discharged within the motor assembly and direct it toward a return fluid line.

The lubrication system may have a fluid pump that provides a pressure gradient to the lubricant resulting in circulation through the fluid system. Such a pump may be a fixed displacement pump, such as a rotary pump, or a variable displacement pumps, such as a gear or piston pump. The pump may be operationally connected to a mechanical or electrical power source and may be operated continuously or intermittently during motor operation. A wet sump active lubrication system may have a single fluid pump operationally connected to a collection pan to circulate oil through fluid lines and within the lubricated system. In this case, the majority of the oil supply is located in the collection pan. Alternatively, multiple fluid pumps may be operated in a dry sump active lubrication configuration where fluid from the collection pan is continuously pumped into a holding tank, preferably with a large height relative to its cross-sectional area, and a second pump may pump the fluid under a separate, controlled flow rate back to the motor to complete lubricant circulation.

The lubrication system may have one or more directional nozzles to direct lubricant to specific locations within the motor assembly including, for example, the traction plates, gimbal bearings and stator poles.

The output shaft may provide an input to an additional gear train, such as a planetary gear set.

Various examples of the invention disclosed herein can provide particularly high torque densities, and can be used to provide essentially smooth output shaft power for propelling vehicles, as well as in stationary systems. The design concepts can more effectively harness normal force, axial force and tangential force for generating shaft power, without some of the traditional trade-offs of harnessing one at the expense of the others.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
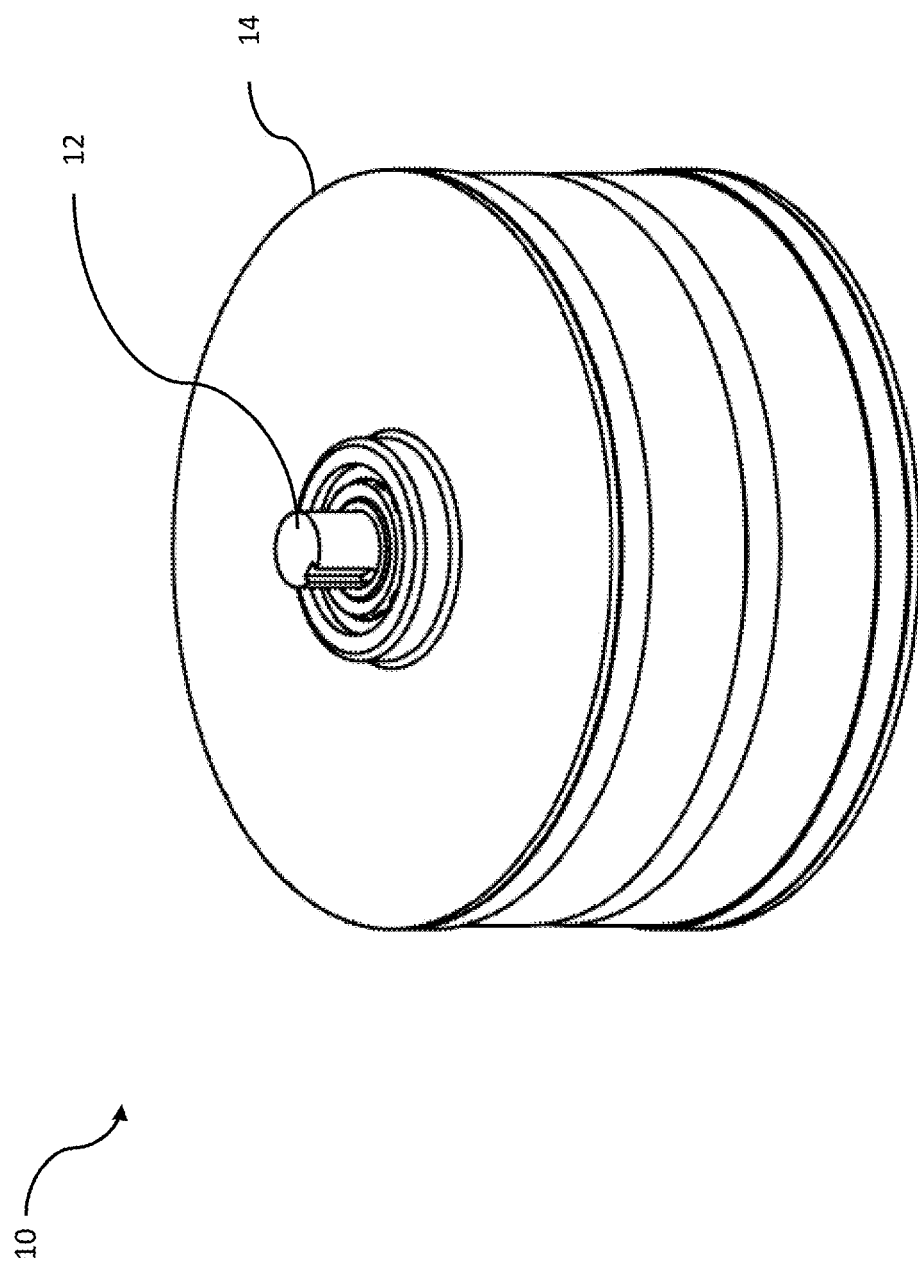
FIG. 1 is a perspective view of a first example of an electric motor
Figure 2:
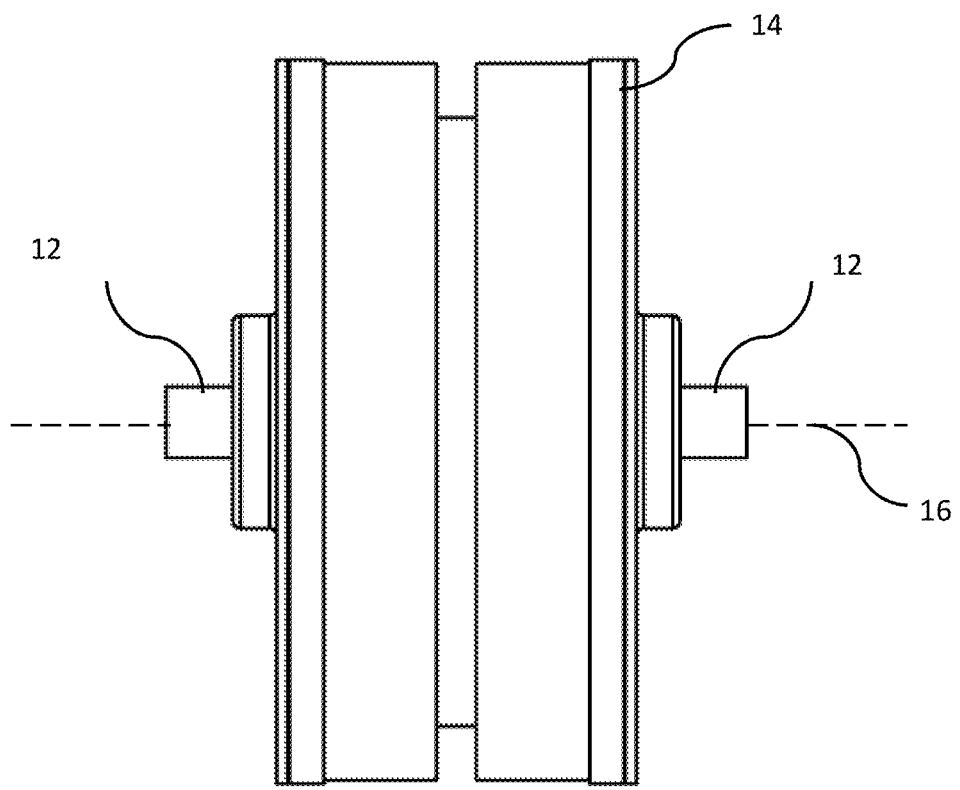
FIG. 2 is a side view of the motor of FIG. 1.

Referring first to FIGS. 1 and 2, electric motor 10 has an output shaft 12 rotatable with respect to the motor housing 14, which is considered in the description that follows to be the datum with respect to rotations and other motions of motor components. In use, output shaft 12 would be coupled to another object to which motor 12 would impart rotary power when electrically activated by appropriate electrical power and signals. As seen in FIG. 2, output shaft 12 extends through the motor and is exposed at both ends, meaning that rotary power can be transmitted at both ends of the motor. Housing 14 is shown as rotationally symmetric about the rotation axis 16 of output shaft 12, but may be of any external shape and will generally include means for securing the housing to other structure to prevent housing rotation during motor operation.

Figure 3:
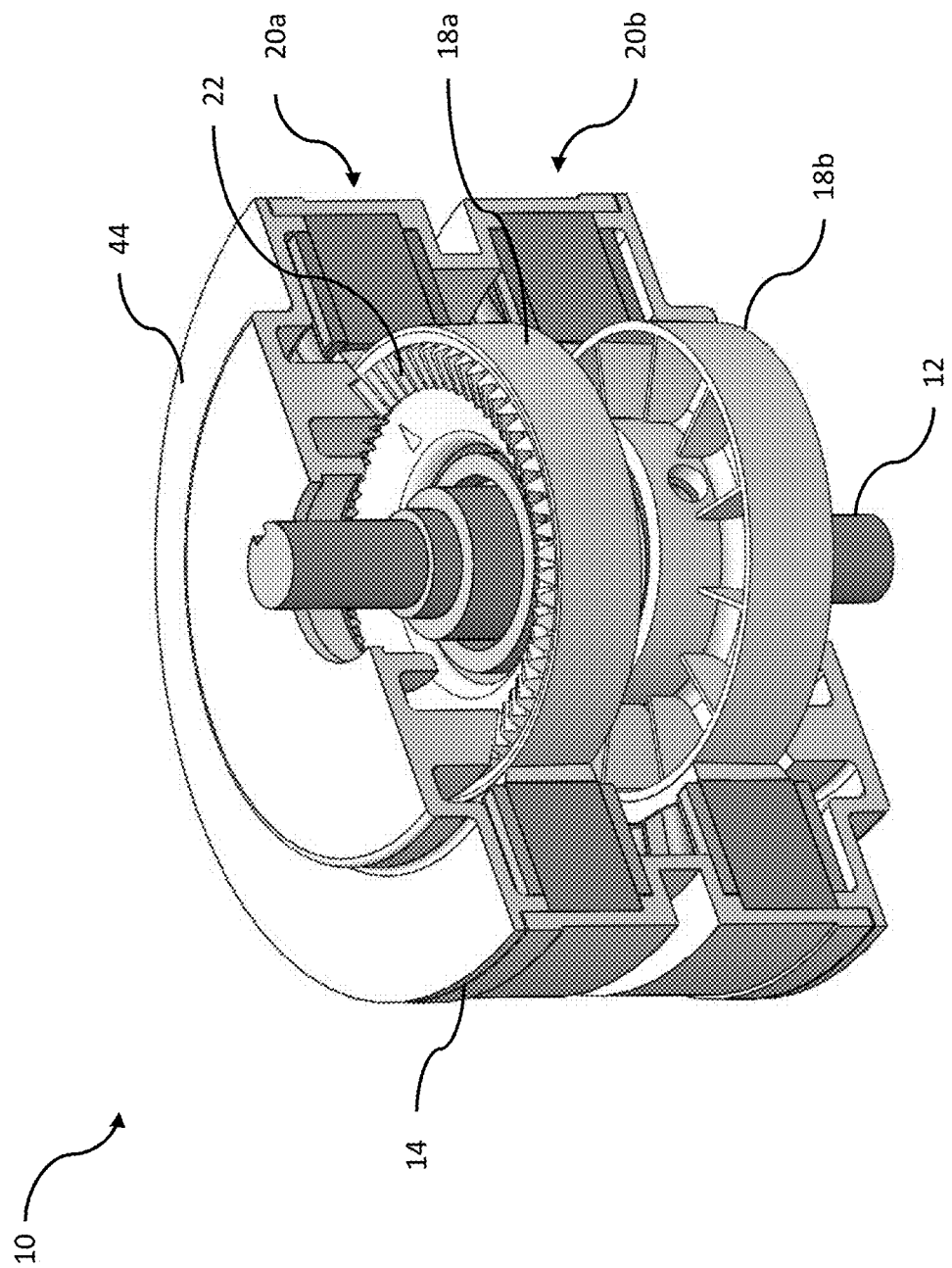
FIG. 3 is a partial perspective cross-sectional view of the motor of FIG. 1, with the non-rotating components sectioned.

Referring next to FIG. 3, motor 10 contains two rotors 18a and 18b, each associated with a stator. Rotor 18a is disposed within stator 20a, and rotor 18b is disposed within stator 20b. As described more fully below, electrical activity in stator 20a, properly controlled, drives motion of rotor 18a, and similar electrical activity in stator 20b drives motion of rotor 18b. Both rotors 18a and 18b are rotationally coupled to output shaft 12, such that any rotational component of resultant rotor motion is transmitted to output shaft 12, causing the output shaft to rotate. For ease of illustration, the bearings supporting the output shaft at each end of the motor are omitted.

Unlike in conventional rotary electric motors, however, the motion of rotors 18a and 18b is not purely rotational. As discussed below, each rotor nutates with respect to the stators, a motion which can be described as a wobbling in which the rotor rolls against a surface of the stator while a tilt axis of the rotor progresses around the output shaft to sweep a generally conical surface. The active air gap between each rotor and its associated stator is generally radial in that it is between the outer circumferential surface the rotor and an adjacent inner circumference of the stator, as in a conventional radial gap motor. However, because of the nutation of the rotor the air gap in this motor is dynamic, meaning that it changes at any particular point around the rotor during the nutation cycle, as will be discussed below.

As seen in FIG. 3, rotor 18a carries a series of gear teeth in its upper surface, which engage a series of rotor teeth 22 in the stationary end cap 24 of the associated stator 20a. Rotor 18b has a similar series of teeth (not visible in this view) that engage teeth of the end cap of stator 20b. In this example, the mated gear teeth form a nutating traction interface at which the nutating rotor rolls across the stator, with an engagement point that progresses about the rotor in sync with progression of the rotor tilt axis. We call this a traction interface because it functions to prevent rotational slipping of the rotor with respect to the stator. The nutating motion of the stator enables a large percentage of the gear teeth of the traction interface to carry load at any point in time, distributing the traction load across several teeth at once. In some of the illustrated examples, at least one-third of the gear teeth are transmitting torque at any one time. For cycloidal gear teeth, half the teeth may be loaded at any point. For implementations that include gear teeth along the traction interface, the gear teeth predominantly mesh in an axial direction. That is, the interface transmits an axial load or a load perpendicular to the magnetic air gap. Examples of meshed gear teeth along the traction interface throughout this disclosure can be considered axially meshed. Other examples of traction interfaces do not feature meshed gear teeth. In some implementations, the contact along such a traction interface is predominantly axial. In one alternative, the traction interface is between rigid metal surfaces (as occurs between railroad wheels and rails), where metal-metal friction enables traction. This rail may be angled to increase relative pressure, and may be covered with a solid high friction material, such as a compliant rubber or other elastomer, or employ a frictional fluid as has been used in some automotive continuously-variable transmissions. The rail may be mechanically loaded by the rotor only, or may contain a secondary mechanical preload. In the event of a secondary mechanical preload, the delta angle between the stator and rotor would be preferably greater than 10 degrees, otherwise the timing of the preload must be controlled and driven independently of stator coils Referring next to FIGS. 4 and 5, each stator 20a and 20b features a series of individually energizable windings or coils 26 associated with a ferromagnetic stator core 28. Core 28 may have, for example, a plurality of stator projections that may protrude from a stator yoke, or back iron, thereby creating stator slots and poles. The stator core may be of one continuous material, or a combination of discrete components assembled in the motor. While a continuous material may provide greater dimensional consistency, a series of discrete stator poles maintained in mechanical alignment by the stator housing may enable efficient manufacturing and assembly. The terminal ends of the stator projections may be diffuse, straight or inferior with respect to the stator projections and back iron or yoke. In this example the stator projections are straight and of constant cross-section from the yoke to their distal end at the air gap.

Figure 4:
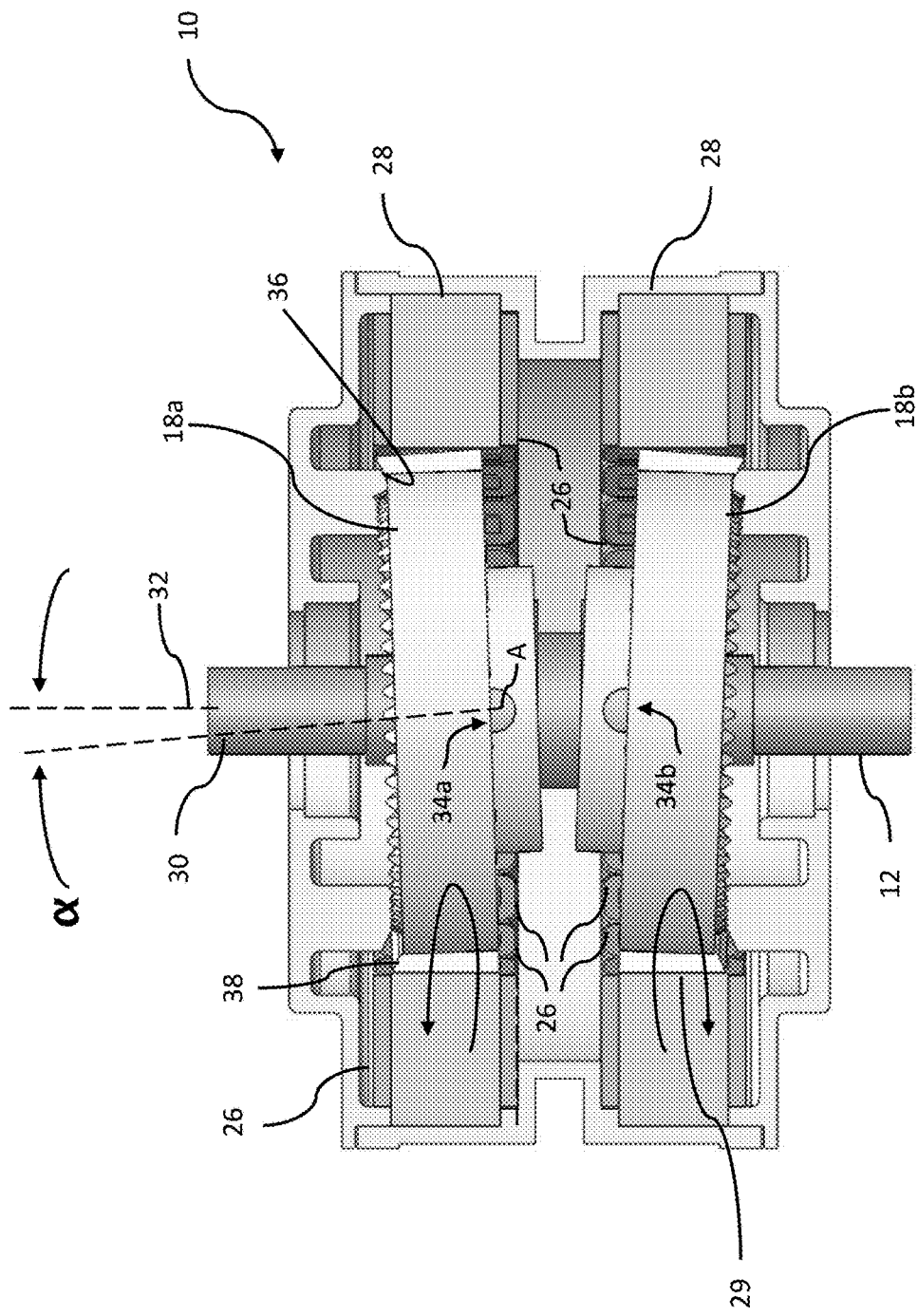
FIG. 4 is a side view of the cross-section of FIG. 3, with the rotors tilted in a first sense.

The outer circumferential surfaces of the rotors in this example are conically ground, while the inner surfaces of the rotors generally define a cylindrical surface. In FIG. 4, the upper rotor 18a is shown tilted to the left with respect to output shaft 12, while the lower rotor 18b is tilted in the opposite sense. In this position, the air gaps 28 between the rotor and stator surfaces are of generally constant radial width along the axial length of the gap at the left extent of each rotor in the figure, while at the right extent of each rotor the air gap changes along its length, decreasing toward the space between the rotors. The tilt axis 30 of rotor 18a makes an angle α of 4.34 degrees with respect to the stationary rotational axis 32 of output shaft 12. As rotor 18a nutates and tilts progressively toward different coils 26 of stator 20a, its tilt axis 30 sweeps a conical surface with an apex at A along the output shaft axis at an elevation of gimbal connection 34 between the output shaft and rotor 18a. In the tilt position shown, the air gap reluctance between rotor and stator is at a minimum at coil 26 on the left, and greatest at the coil on the right. The curved arrows shown crossing the gap at the left are simply to illustrate that coils slightly in advance of that position about the stator are energized to generate magnetic flux across the gap, while the coils at the opposite extent of the stator are not energized. As will be discussed further below, this creates a compression wave, or progressing radial compression force between stator and rotor, to motivate the nutation of the rotor. In the tilt position shown in FIG. 5, at one-half of a nutation cycle from the position shown in FIG. 4, the air gap reluctance between rotor and stator is at a minimum at coil 26 on the right, and greatest at the coil on the left. Tilt of the rotors is limited by rolling contact between a tapered stop surface 36 of each stator end cap and a tapered edge surface 38 of the adjacent rotor.

The relationship between the progressing compression wave and rotor nutation can be explained with reference to the simple model shown in FIG. 6. A flat disk 40 is mounted on a rigid axle 42, one end of which rests on a flat surface at point B. The disk and axle are supported on the flat surface by the end of the axle and the edge of the disk, at points B and C. The disk can be caused to roll on the flat surface by pushing down at the disk edge near contact point C, such as at D. The same effect can be caused by pulling down on the disk edge at D by an attraction force between the disk edge and the flat surface. Once the disk has begun to roll, the rolling can be continued indefinitely by successively pulling the disk toward the flat surface at points always just ahead of the instantaneous contact point C while the axle 42 contact point B remains stationary. The resulting rolling or nutation would be, for example, the motion experienced by a child's toy top after it stops spinning upright. The edge of the disk rolls on the flat surface; it does not slide. Similarly, energization of each coil of a stator creates a local attraction force pulling on the rotor. By sequentially energizing the coils always on the leading side of the point of minimum radial air gap (preferably, 15-60 degrees in advance), the rotor can be made to nutate like a leaning top, rolling against the stop surfaces of the stator end caps. One key difference between the operation of the simple model of FIG. 6 and the operation of the motor of FIGS. 4 and 5, however is that in the simplified model the compression or attraction force occurs across a gap between disk edge and flat surface that is bounded by the rolling surface itself. As the disk rolls around point B, the distance between the rolling edge of the disk and the flat surface changes as much as the distance across which the attraction between disk edge and flat surface operates. In this model, they are the same.

Figure 5:
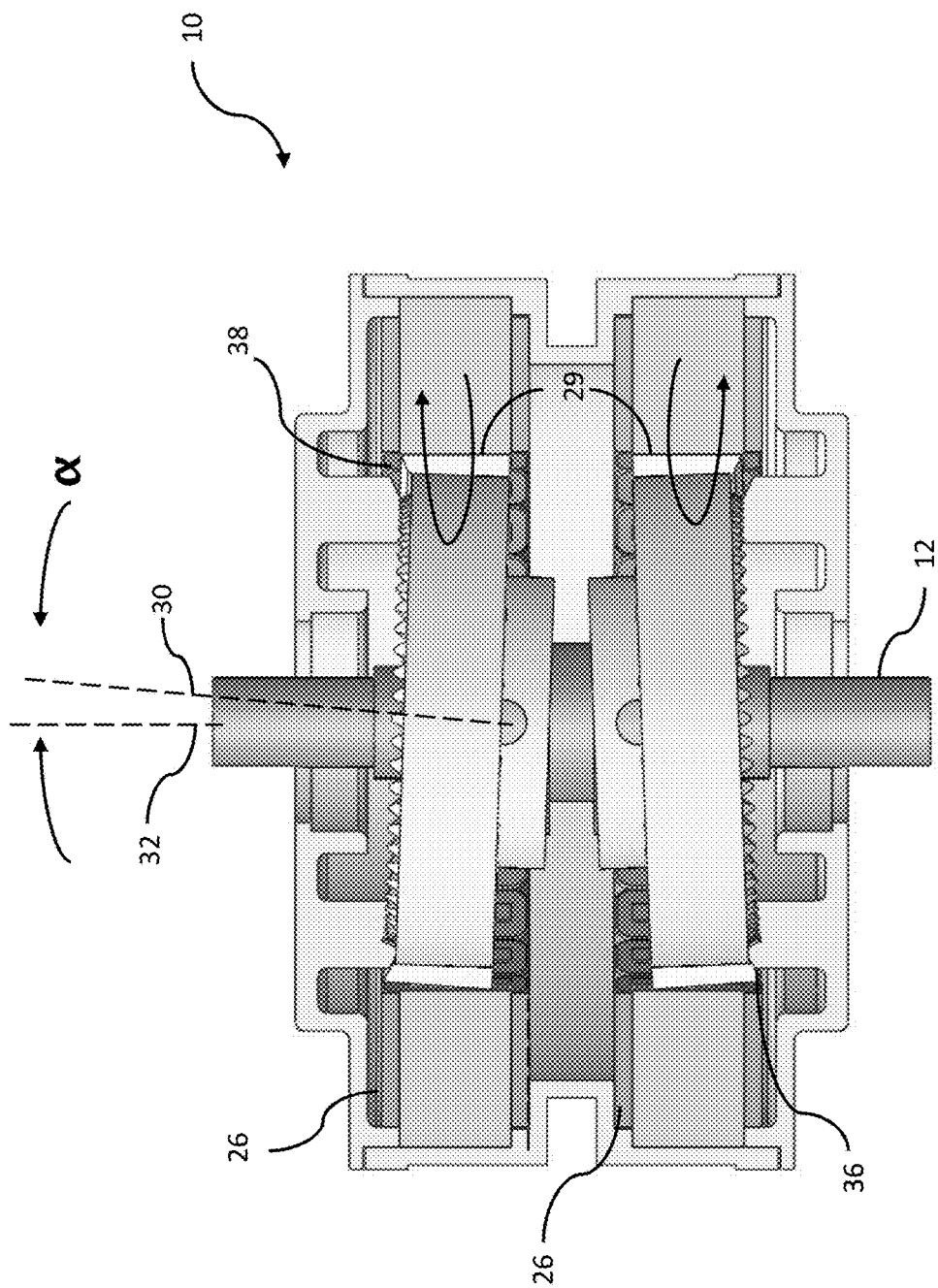
FIG. 5 shows the rotors tilted in a second, opposite sense.
Figure 6:
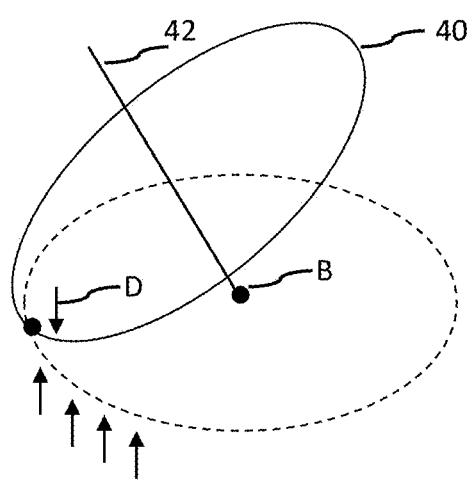
FIG. 6 is a schematic illustration of the operation of a nutating rotor motor.

In the motor of FIGS. 4 and 5, on the other hand, the distance the rolling surface of the rotor moves during nutation is essentially axial and is the maximum space between surfaces 36 and 38, which occurs where the active air gap width is minimal—e.g., on the right side of FIG. 5—while the gap across which the attractive compression force operates (the magnetic air gap) is essentially radial. This allows the nutation to effect a much larger displacement change at the rolling interface than at the active magnetic air gap. In this particular example, it also allows the rotor to be tilted such that the rolling contact point can be always on an opposite side of the rotor from the compression wave. Configuring the motor such that the rolling contact point and compression wave progress on generally opposite sides of the output shaft axis can enable smaller packaging and higher switching frequencies, due to lower relative traction interface pitch velocity. Conversely, configuring the motor such that the rolling contact point and compression wave progress on generally the same side of the output shaft axis (as in the motor example of FIGS. 20 and 21), provides a beneficially short mechanical load path, in that the torsional force component does not have to leverage across the gimbal.

Referring back to FIGS. 4 and 5, the axial and radial inertial forces caused by the acceleration of the mass of one of the rotors are balanced by those of the other rotor due to the opposing nutations of the two rotors. The nutations are, in effect, mirror images of each other with respect to a transverse plane bisecting the motor between the rotors. The progressing magnetic engagement points of the two rotors are, pragmatically, within 10 degrees of each other. While generally balanced, there will always be a slight drag on one rotor as compared to the other, and the power electronics will always try to accelerate the one going slightly slower. The tolerance stack-up in gimbals, etc., may result in a slip of up to 3 degrees.

Gimbals 34a and 34b connecting rotors 18a and 18b, respectively, to output shaft 12 are typical two-ring, crossed-axis gimbal assemblies that freely permit 360-degree tilting for nutation but that transmit torque about output shaft axis 32. To provide the necessary degrees of freedom, the output shaft is pinned to an inner ring of the gimbal by an inner transverse pin (not visible in these views), and the inner ring of the gimbal is pinned to the rotor by transverse pins at 90 degree angles to the inner pin. The pinned components are free to rotate about the pins on lubricated bearing surfaces.

Figure 7:
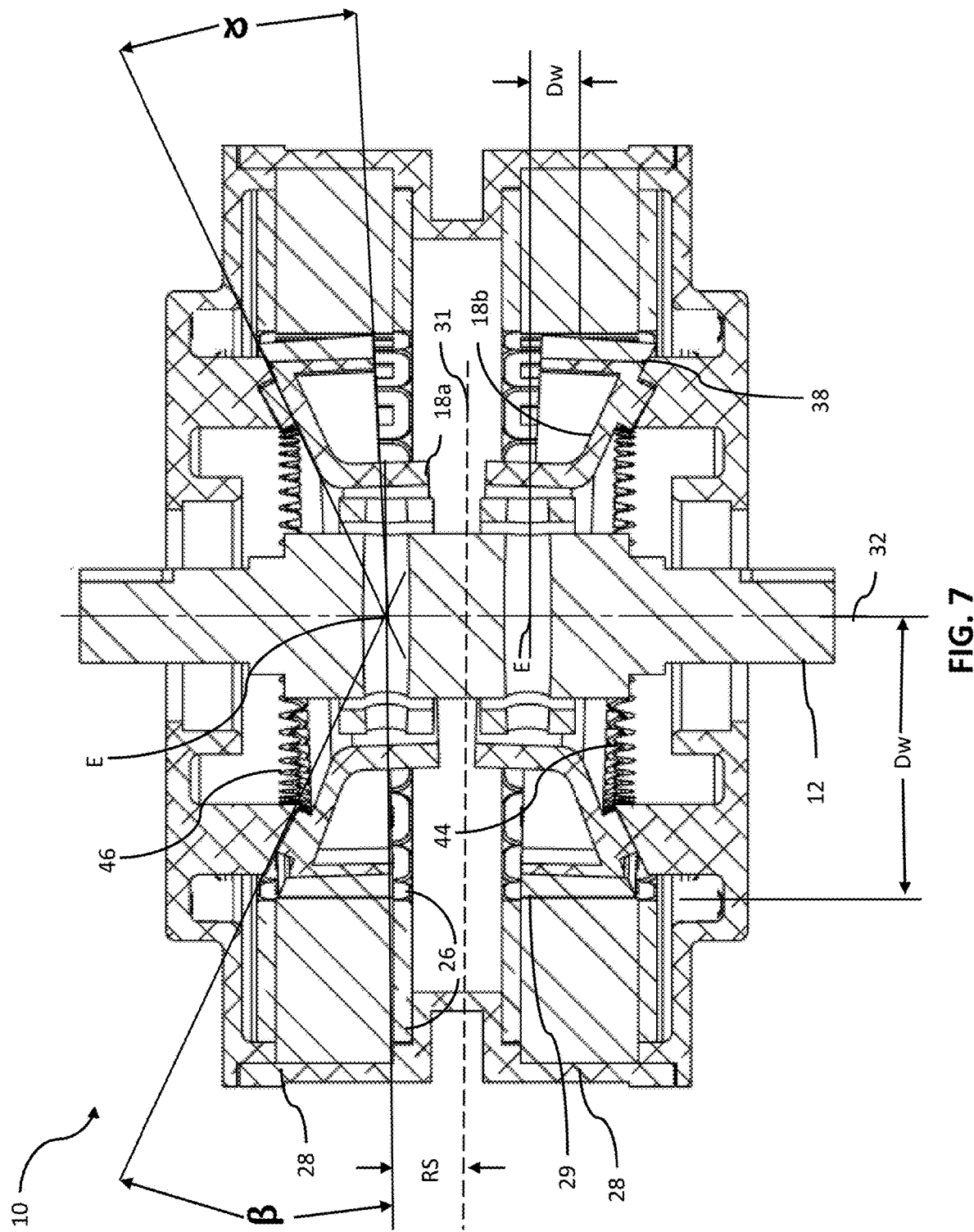
FIG. 7 is a cross-sectional view of the motor of FIG. 1.

Referring next to FIG. 7, in this example the tapered stop surfaces 36 of the stator end caps define a stator cone angle $\beta$ of 25.00 degrees with respect to a perpendicular to the output shaft axis, while the tapered edge surface 38 of the rotors define a rotor cone angle $\gamma$ of 22.83 degrees with respect to a perpendicular to the rotor tilt axis. The tilt of the rotor during operation is thus +/−2.17 degrees, which is just sufficient to allow for indexing of the gear tooth engagement between rotor and stator during nutation. The gear tooth engagement, which is part of the traction interface between rotor and stator, features a series of rotor gear teeth 44 meshed with a series of stator gear teeth 46. To effect a rotational advance of the rotor (and thus, the output shaft) with respect to the stator, the number of teeth about the rotor is different from the number of teeth about the stator, such that as the rotor rolls about the stator in its nutation the rotational indexing of the rotor equals the gear tooth pitch times the difference in the number of teeth. In this example, the stator end caps each have 59 teeth and the rotors each have 60 teeth, or one more tooth than the engaged stator end caps. In other words, firing the stator poles sequentially to create a compression wave completing a full revolution about the motor will cause one full nutation cycle of the rotor and advance the output shaft by the rotational equivalent of one tooth, or in this case 6 degrees.

Figure 8:
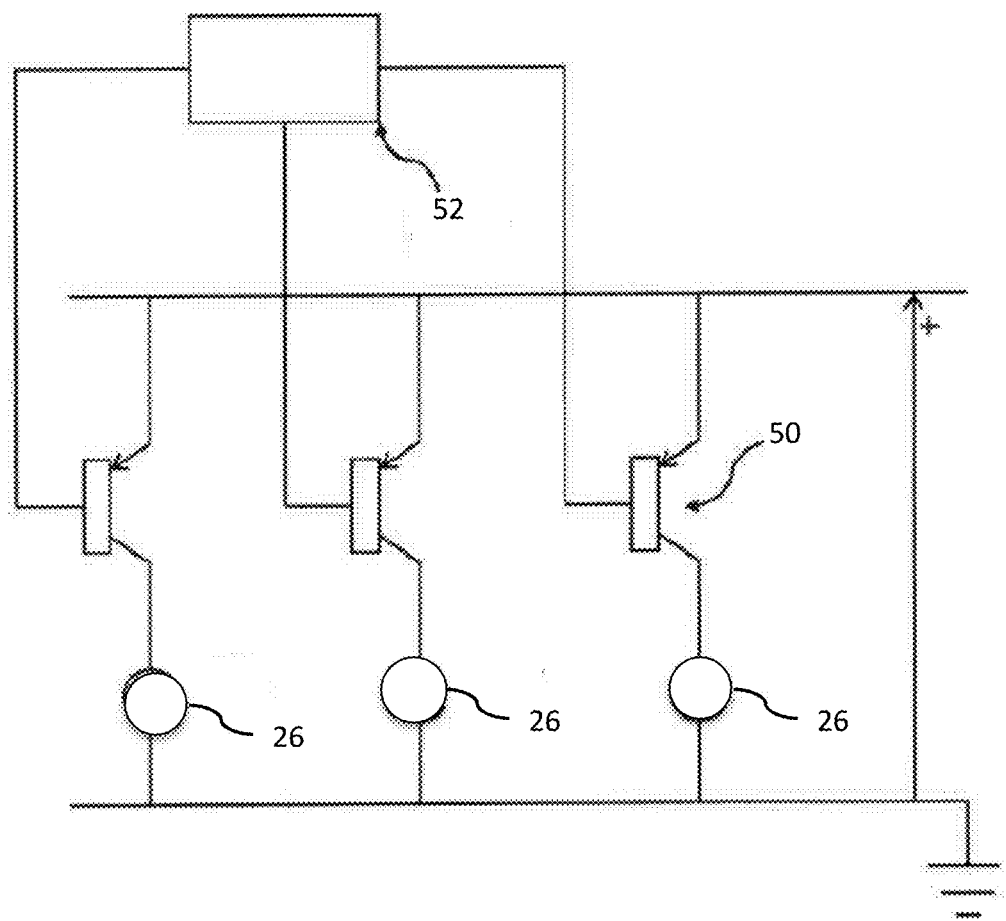
FIG. 8 is a schematic illustration of a motor controller including power switching.
Figure 9:
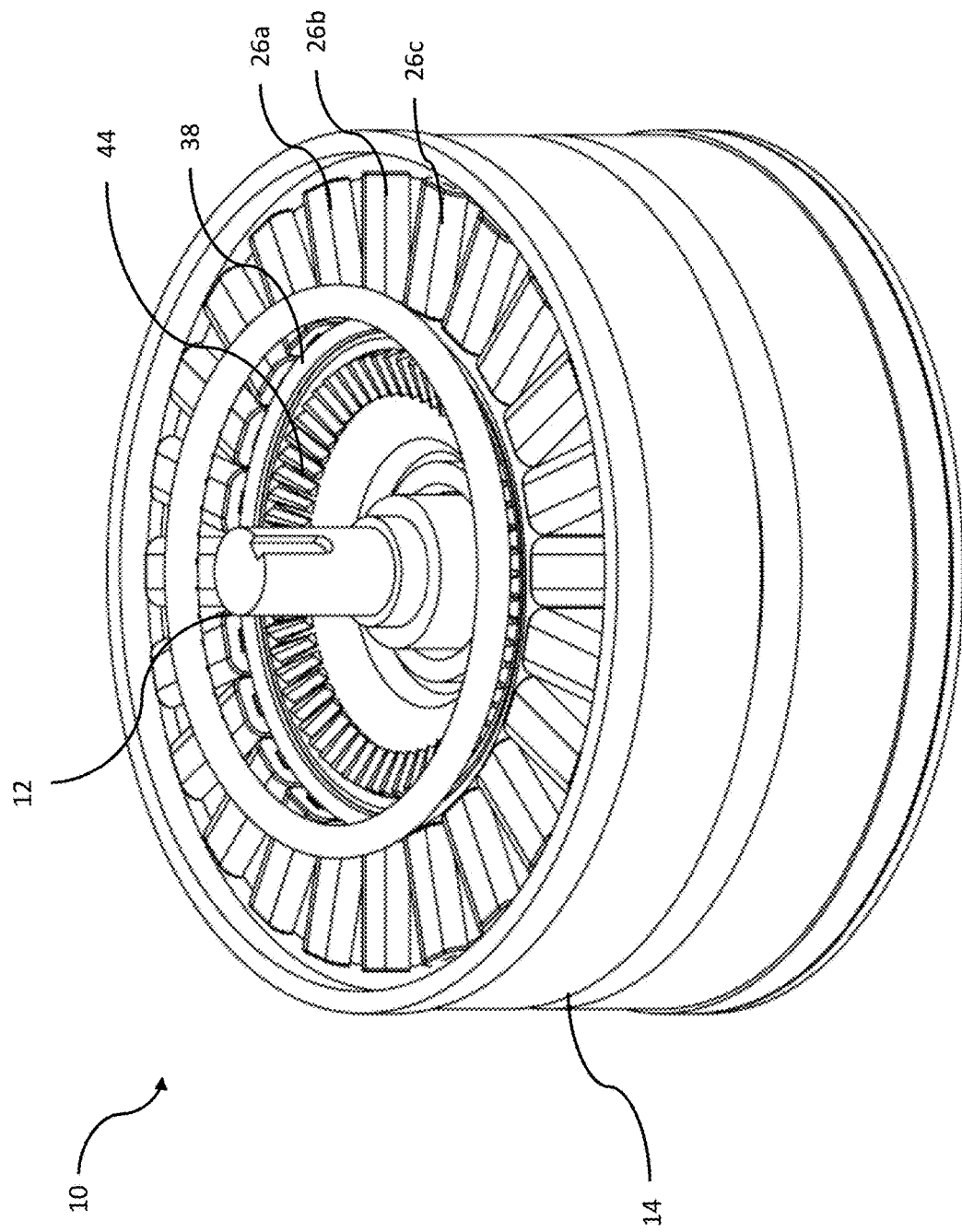
FIG. 9 is a perspective view of the motor of FIG. 1, with a stator end cap removed.

Motor controller power electronics can be configured to fire the stator coils in sequence as in reluctance motors. FIG. 8 shows a simple schematic of a suitable motor controller, in which a processor 48 controls switches 50 to sequentially energize stator poles 26a, 26b and 26c. Referring also to FIG. 9, such a sequential activation would cause a nutation in which the tilt axis progresses in a clockwise direction about the rotor axis, looking down into the motor. Reversing the sequence would cause a progression in the opposite direction, meaning that the motor can be driven at full load in either direction. While only three switches are shown in FIG. 8, it will be understood that the motor controller would have a switch for each stator pole, or 24 switches to energize the 24 coils shown in the stator arrangement of FIG. 9. Referring back to FIG. 5, because the nutating motions of the two rotors are mirrored, rotationally aligned pairs of poles of the two stators can be energized together. In other words, the pole 26 shown at the far left of the upper stator would be energized at the same time, and for the same duration, as the pole 26 shown at the far left of the lower stator. The rotationally aligned pole pairs of the two stators can therefore be energized in parallel via the same switch. A motor controller for the twin-stator motor shown in FIG. 9, for example, would need a total of 24 switches. Alternatively, adjacent pole pairs may be wired in series via a common switch, but in such cases the instantaneously faster of the two moving rotors would generate a slightly larger back-EMF and instantaneously draw more relative electrical power as compared to the slower pole, thereby providing additional acceleration and separation of relative velocities. Parallel wiring of adjacent poles of separate rotors, by contrast, can provide a negative feedback mechanism due to the parallel inductive loads. In that sense, it can be considered self-balancing and produce a smoother output torque with lower potential for vibration.

Without electrical current running through any of the motor stator poles, there is in theory no internal motor forces holding the rotors in position. The stator laminations or core can be formed from a ferromagnetic material with an appropriate degree of remanence, such that the rotor will be held most attracted to the last-energized pole.

Figure 10:
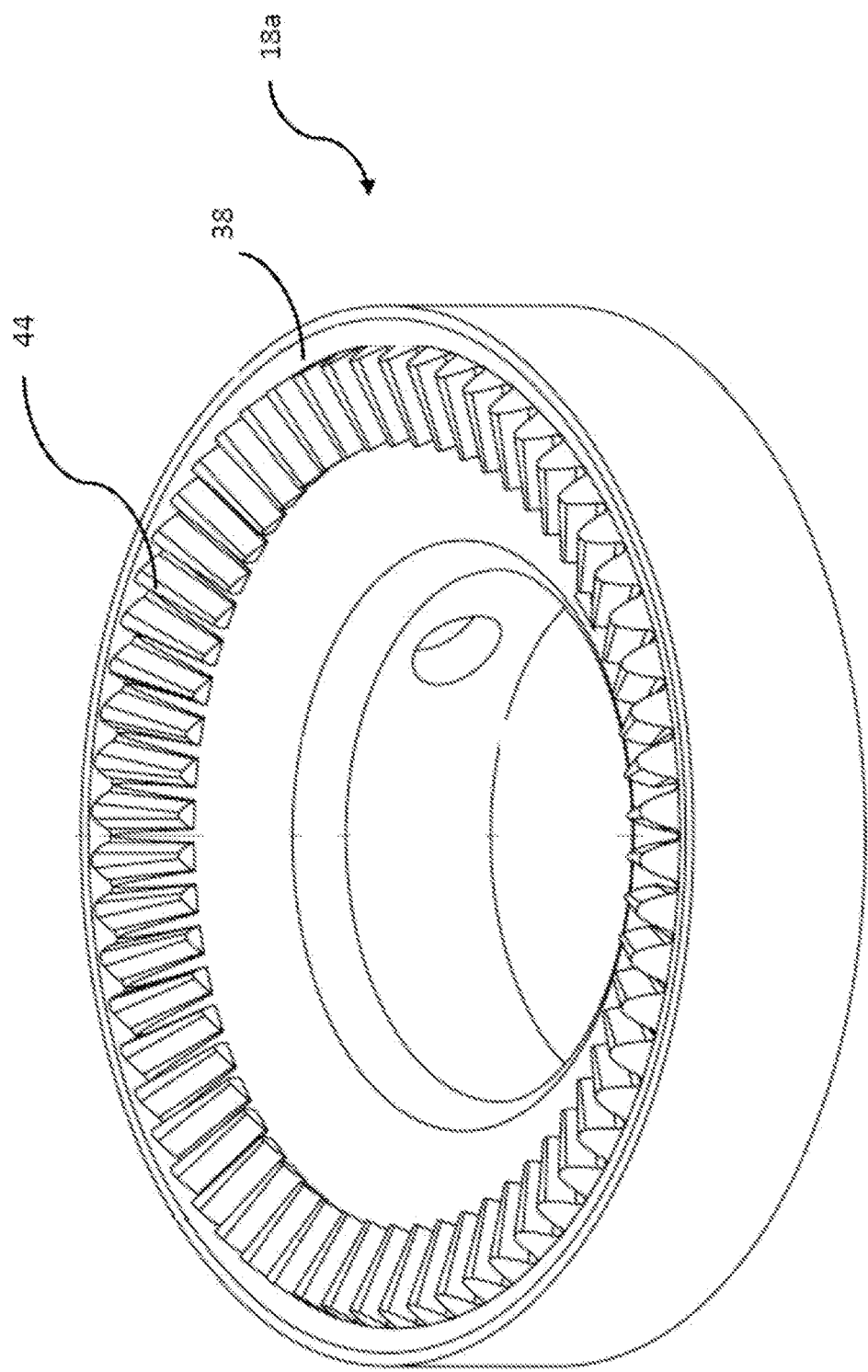
FIG. 10 is a perspective view of rotor.

Referring next to FIG. 10, the tapered edge surface 38 of the rotor defines a frustoconical surface that rolls about the mating tapered surface of the stator end cap during nutation of the rotor. In this example, the contact surface is outboard of the gear teeth, but in other examples it can be located inboard, or in some cases the gear teeth themselves can be designed for 'zero gap' rolling in which the mating tooth profiles themselves limit the tilting of the rotor. The meshed gear teeth serve to react the torque transmitted from the rotor to the output shaft, and can be of any suitable profile.

Referring back to FIG. 7, as noted above it is the tapered edge surface 38 of the rotor that defines the rotor cone angle γ, the apex of which is on the output shaft axis 32 at an elevation corresponding to a tilt center of the gimbal on which the rotor pivots. We refer to this apex E as the rotor focal point. Motor 10 has a working radius Rw, as a radial distance between the rotor axis 32 and the nominal radial position of air gaps 29, of about 75 mm, which is essentially one half of the inner diameter of the stator poles. The illustrated motor has a nominal overall diameter of 25 cm. A mirror plane 31 bisects the motor midway between the two rotors, and is equally spaced from each focal point E by a distance of about 19 mm. The two rotor/gimbal assemblies are essentially mirror images of each other with respect to the mirror plane. The rotor focal point E can be determined by establishing the center of the nutating motion of the rotor on the central axis of the rotor gimbal assembly. Geometrically, the focal point is at the vertex of both the stator and rotor cones. The angle of these cones is used to derive many of the physical features of the motor's geometry including tooth size, angular distance traveled for the poles, radial distances traveled for the poles, nutation motion and operating angle. These geometric relationships, as well as gear ratio, are important in establishing the overall motor geometry.

The dynamic nature of the air gaps, caused by the nutation of each rotor, visible in this figure by comparing the air gaps on the left side of the figure, to the air gaps on the right side of the figure. As discussed above, the air gap dynamically changes during motor operation as the rotor nutates about the central axis and with respect to the stator. In operation, the minimum air gap—when the rotor is in its closed position—is the point where there is maximum magnetic alignment between the stator and rotor. The air gap at this minimum point may be a nominal 0.25 mm across, but may vary across the plane of intersection. At this minimum air gap position, the gear teeth at that circumferential position of the rotor are not engaged with those of the stator and are instead in transition. At that instant, the gear teeth 180 degrees away from that circumferential position are engaged and the air gap is at a maximum position. This maximum air gap—when the rotor is in its open position—is the point where there is minimum magnetic alignment between the stator and rotor. Again, at this maximum air gap point, the gear teeth are engaged with the traction interface. The air gap at this maximum point may be 6.86 mm center-to-center, comprising 1.0 mm radial separation and 6.60 mm vertical misalignment between the rotor and stator. For embodiments described below in which the rotor laminations have teeth facing the air gap, these rotor lamination teeth are preferably aligned with the stator poles at the minimum air gap position and at maximum misalignment with the poles at the maximum air gap position.

Figure 11C:
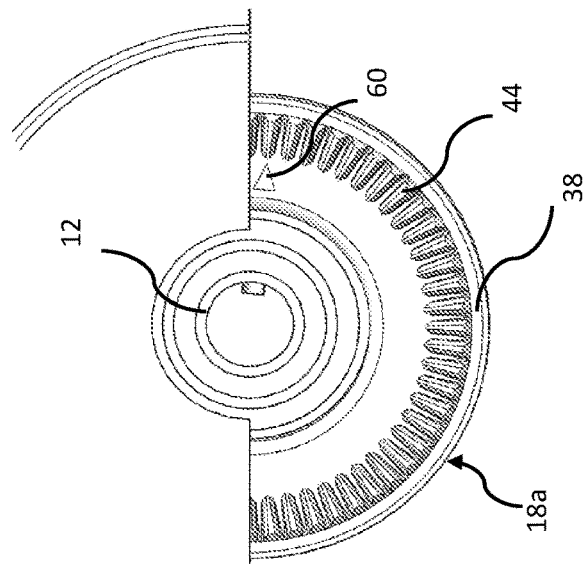
FIGS. 11A-C sequentially illustrate rotational progression of a rotor through one complete nutation cycle.
Figure 11B:
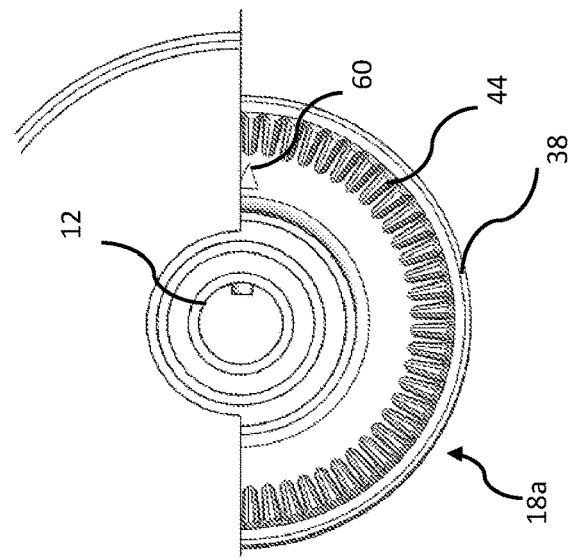
Figure 11A:
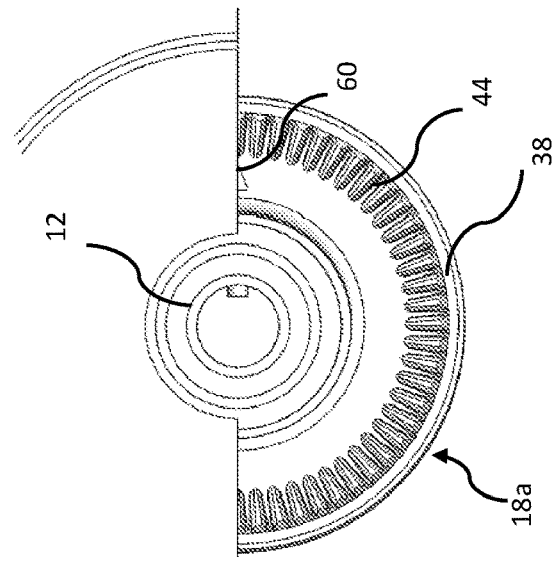

FIGS. 11A-C sequentially illustrate the rotor/shaft rotation resulting from a full cycle of nutation. Beginning with FIG. 11A, an index mark 60 is shown on the rotor surface, aligned with an edge of a cut-away of the stator end cap. After activating the stator coils through a sequence that causes a compression wave to progress 180 degrees about the stator, and causes the rotor axis to tilt through a similar 180 degree nutation, or half of a nutation cycle, the index mark in FIG. 11B shows that the rotor has rotated essentially the equivalent of one-half of a tooth pitch, or in this case, about 3 degrees. After all of the stator coils have been activated to create a full 360 degrees of compression wave and a full nutation of the rotor (FIG. 11C), the rotor and output shaft have effected a total rotation of one gear tooth pitch, or about 6 degrees. One full nutation would move the rotor from the position shown in FIG. 4 to the position shown in FIG. 5 and back to the position shown in FIG. 4, for example.

Electric motors can generate significant heat during operation that require cooling. Moreover, active mechanical components and contact surfaces can benefit from active lubrication, especially during higher frequency operation. For some applications, separate fluids can be used for coolant and lubrication such as water and oil, respectively. For others, fluid such as oil can be used for both coolant and lubrication. In the following description, fluid is referred to as coolant, lubrication, or both when appropriate.

Figure 12:
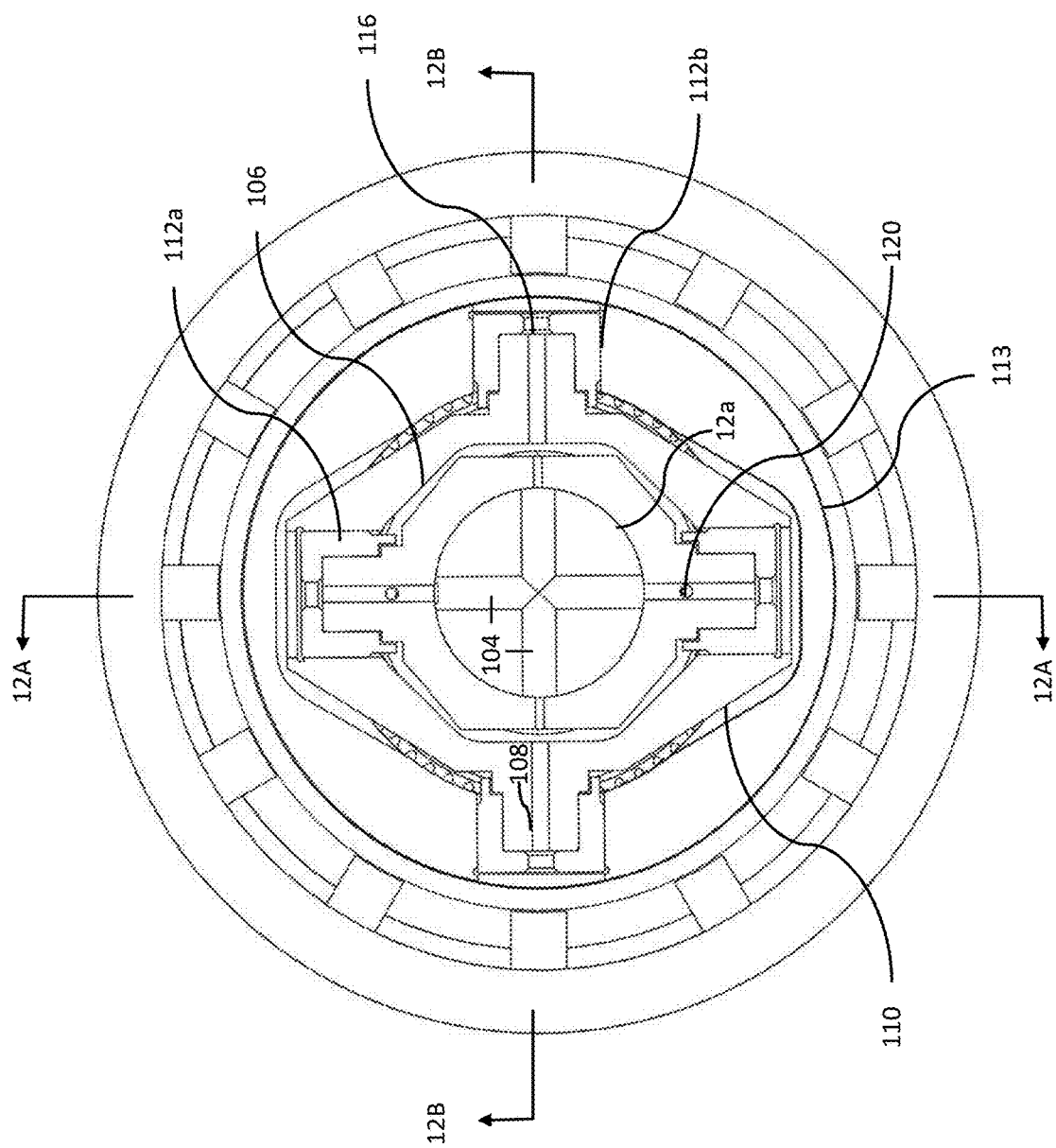
FIG. 12 is a cross-sectional view of another motor through a gimbal assembly.

Referring next to FIG. 12, motor 14a has two rotors spaced along the output shaft, each one of which is gimbal-mounted. The section of FIG. 12 is through one of the gimbal assemblies, and shows a gimbal spindle 106 mounted on shaft 12a. Spindle 106 defines an inner axle on which the inner gimbal ring 110 is mounted to pivot within two inner gimbal bearings 112a secured within inner gimbal ring 110. Inner gimbal ring 110 itself defines an outer axle, perpendicular to the inner axle, on which the outer gimbal ring 113 is mounted to pivot within two outer gimbal bearings 112b secured within outer gimbal ring 113. Gimbal bearings 112a, 112b are secured by lock rings within bores of the spindle rings and could have, for example, bronze or Babbitt metal or other sliding wear surfaces, or roller elements.

Figure 13:
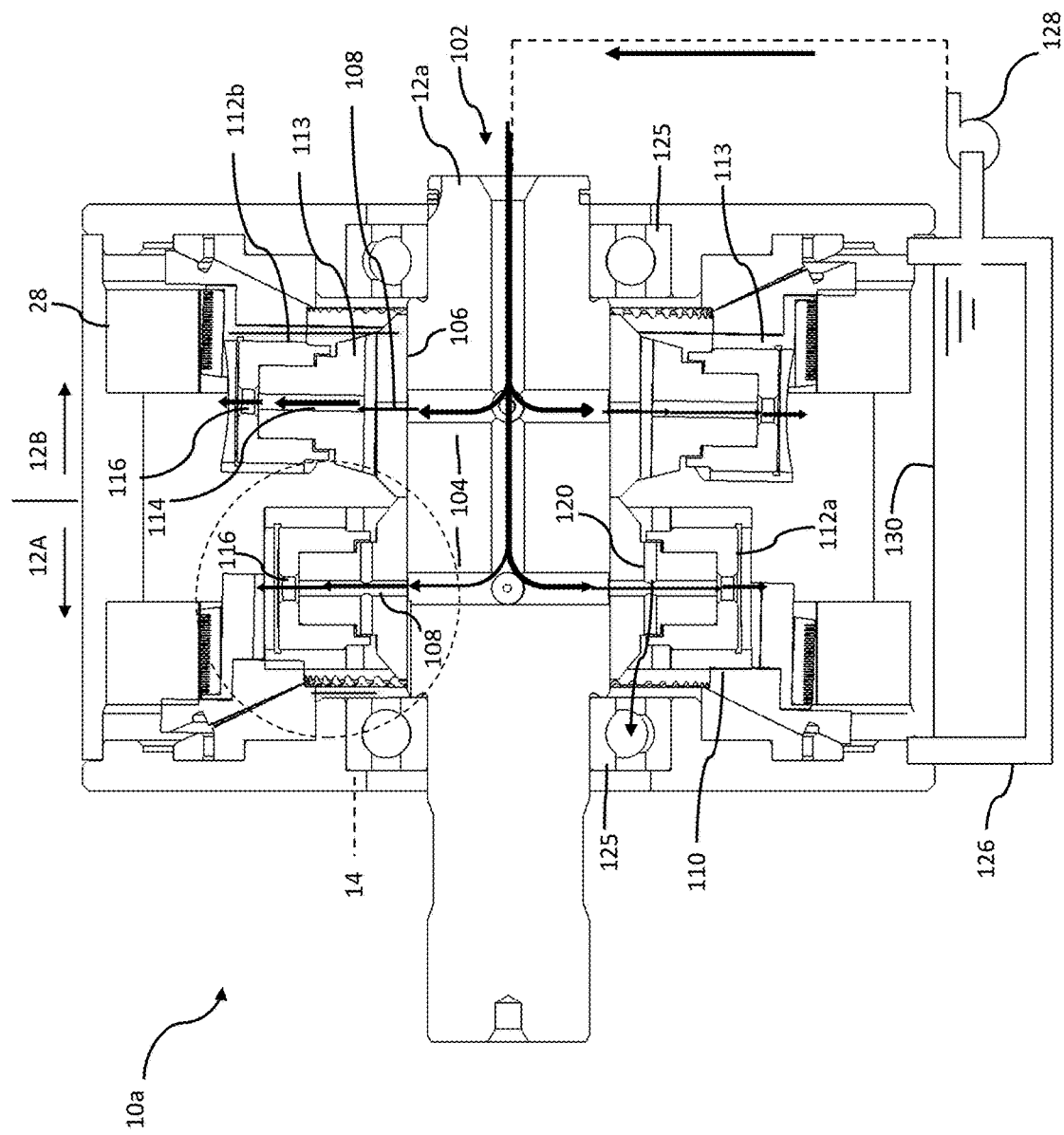
FIG. 13 is a cross-sectional view, taken partially along line 12A-12A, and partially along 12B-12B, of FIG. 12, showing a lubrication and cooling system.
Figure 14:
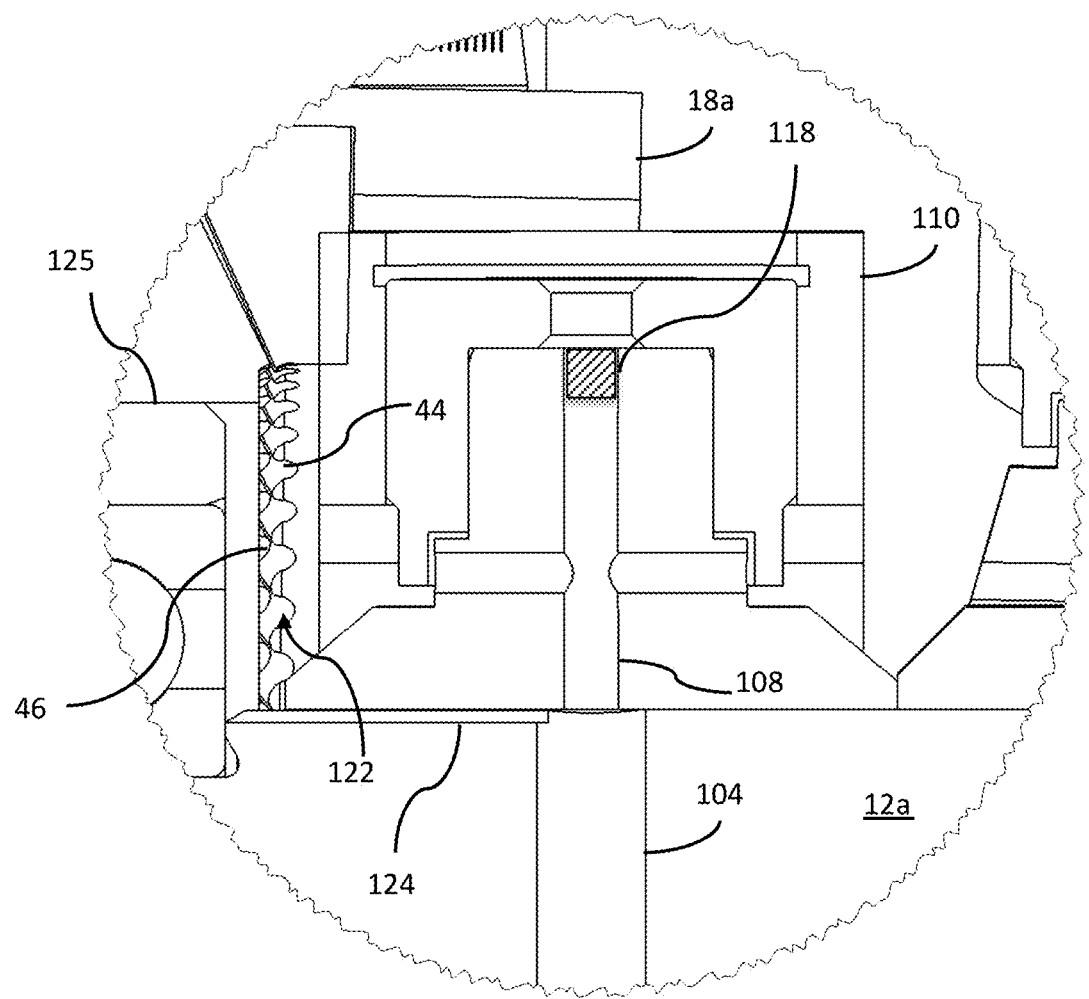
FIG. 14 is an enlarged view of area 14 of FIG. 13.

Referring also to FIG. 13, motor 10a is cooled and lubricated by a fluid pumped into the motor through a bore 102 within the motor output shaft 12a. In this view, the cross-section through the rotor on the left is taken along line 12A-12A of FIG. 12, while the cross-section of the rotor on the right is taken along line 12B-12B of FIG. 12, 90 degrees with respect to that of the left rotor, to show both the inner and outer gimbal bearings 112a, 112b. Given the relatively high frequency operation of the bearings within the gimbal assembly, the active lubrication of the gimbal bearings can be achieved by cross-drilling the output shaft to feed fluid to these bearings via cross-drill passages 104. Here, the inner ring 110 of the gimbal assembly can be fed fluid directly by an orifice 108 through the gimbal spindle 106, while the outer ring 113 of the gimbal assembly can be fed fluid through an orifice 114 through the outer gimbal bearing of the inner gimbal ring. The orifices may be metered to prevent pooling of the fluid, which could cause losses at high speeds. Apertures 116 through the gimbal bearings permit radial flow out of the gimbals toward the stator windings. As shown in FIG. 14, metered orifice plugs 118 may be provided at the outboard end of the radial flow channel 108 of the inner gimbal ring, to direct some of the flow axially along cross channels 120 to feed the gear interfaces 122 and shaft bearings 124. A similar plug (not shown) may be provided at the output end of channels 114 (FIG. 13) of the outer gimbal ring. Alternatively or in addition, grooves 124 can feed fluid to the gear interfaces and bearings directly from the output shaft. The shaft bearings 125 may be sealed on their outboard side, or allow flow through the bearing and back to a sump.

Referring back to FIG. 13, all of the lubricant/coolant fluid forced through the output shaft 12*a* eventually drains into a reservoir 126, which could be open to a lower side of the motor and structurally part of the stator housing. A pump 128 draws fluid 130 from the reservoir and delivers a continuous flow of the fluid under pressure to the output shaft bore 102.

Figure 15:
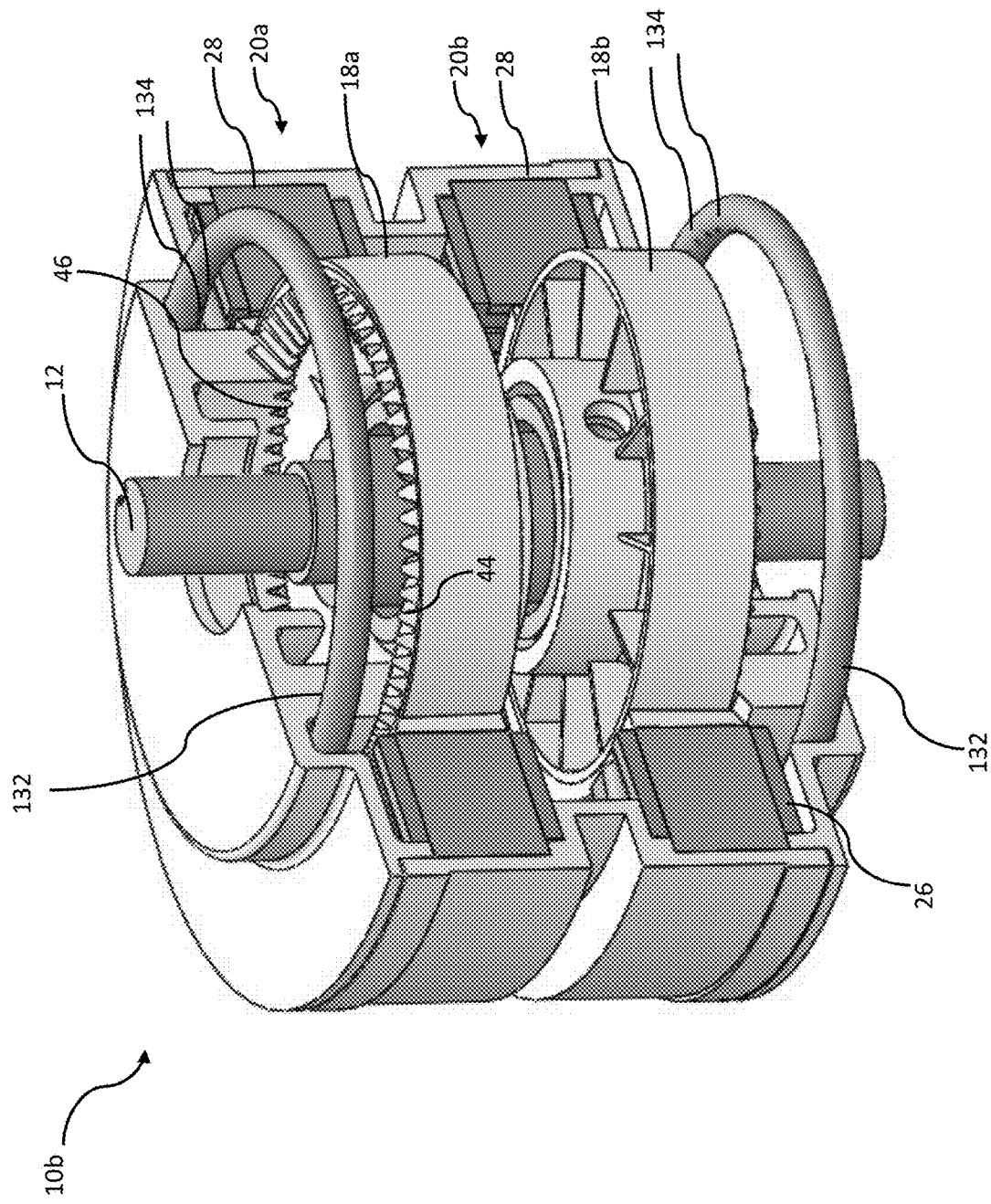
FIG. 15 is a partial perspective cross-sectional view of the motor of FIG. 1, equipped with lubrication rails.
Figure 16:
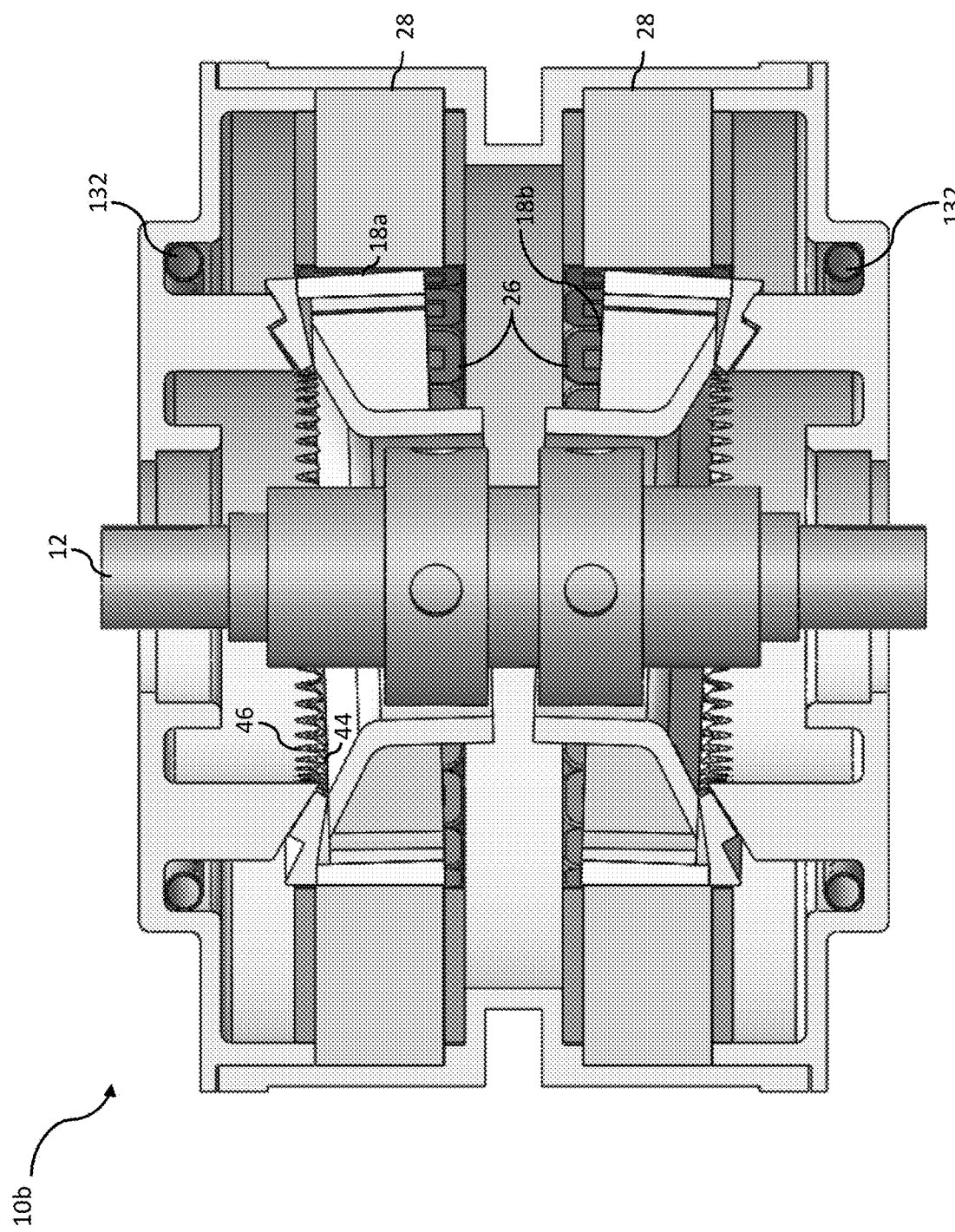
FIG. 16 shows a third example of another electric motor, with a 30 degree nominal stator angle.
Figure 17:
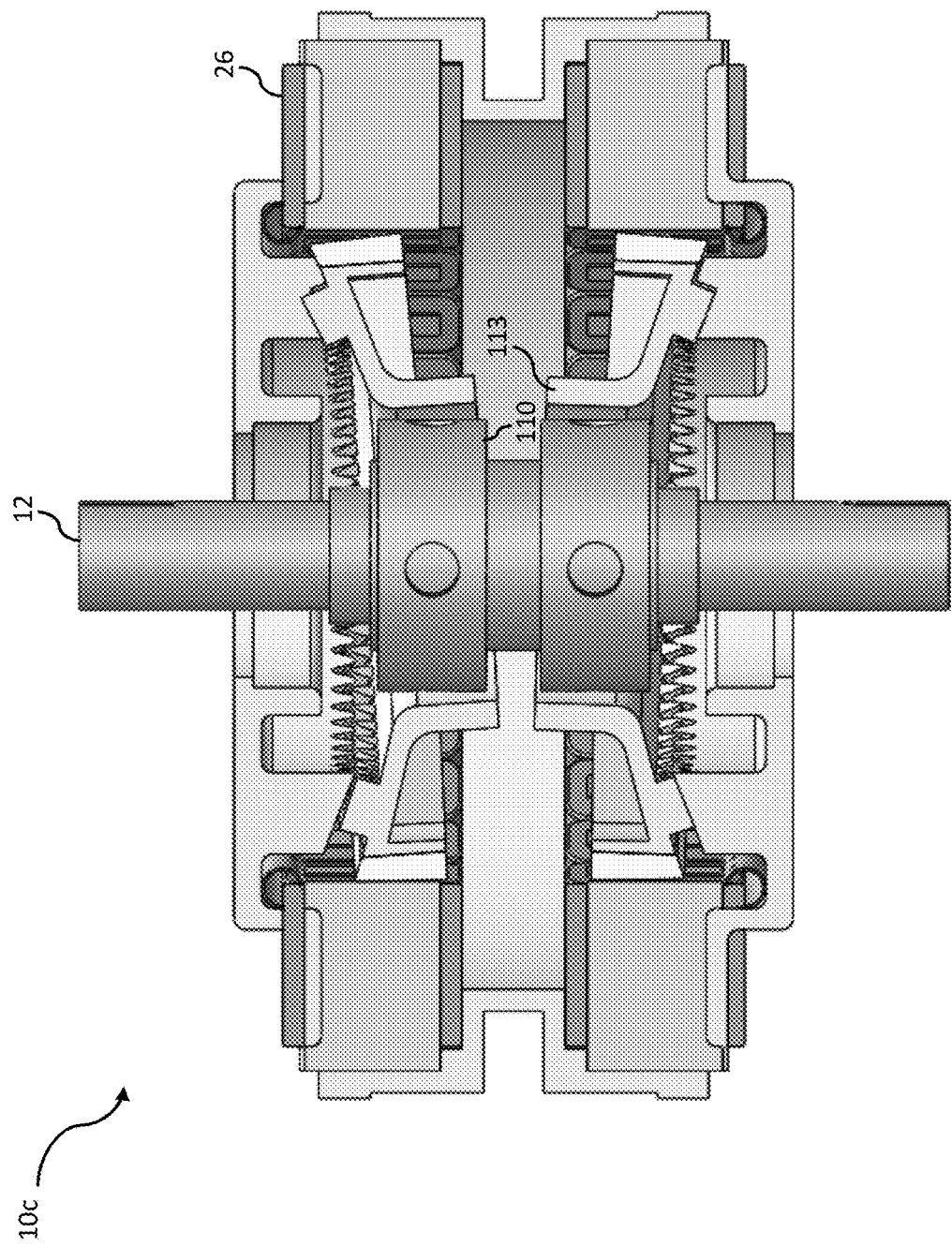
FIG. 17 shows a fourth example of another electric motor, with a 20 degree nominal stator angle.

Referring next to FIG. 15, motor 10*b* has two pressurized lubrication/cooling rails 132 mounted in the stator end plates and defining a series of nozzles 134 directed toward the gear interfaces to continually supply a mist or flow of fluid to lubricate and/or cool the traction control surfaces. The rails are fed by a pump (not shown) and the fluid is recirculated. The rolling gear interface between rotor and stator can be modified for different speed, torque and packaging constraints. Motor 10*b* of FIG. 16, for example, is similar to motor 10 of FIG. 4, but with higher stator and rotor cone angles of 30 and 28 degrees, respectively. The stator and rotor also have fewer teeth in this example, with 59 and 60 teeth, respectively, resulting in lower electrical cycling frequency for a given output speed. The higher cone angles also result in a decreased dynamic loading on the gimbal bearings at a given output speed. Motor 10*c* of FIG. 17, on the other hand, has lower stator and rotor cone angles, of 20 and 18 degrees, respectively, than the motor 10 of FIG. 4. This configuration is particularly well-suited for low RPM applications. The resulting overall length of the stator assembly is also reduced as a result. The switching frequency and the operating tilt envelope of the rotors will depend on the number of teeth and the cone angles.

Figure 18:
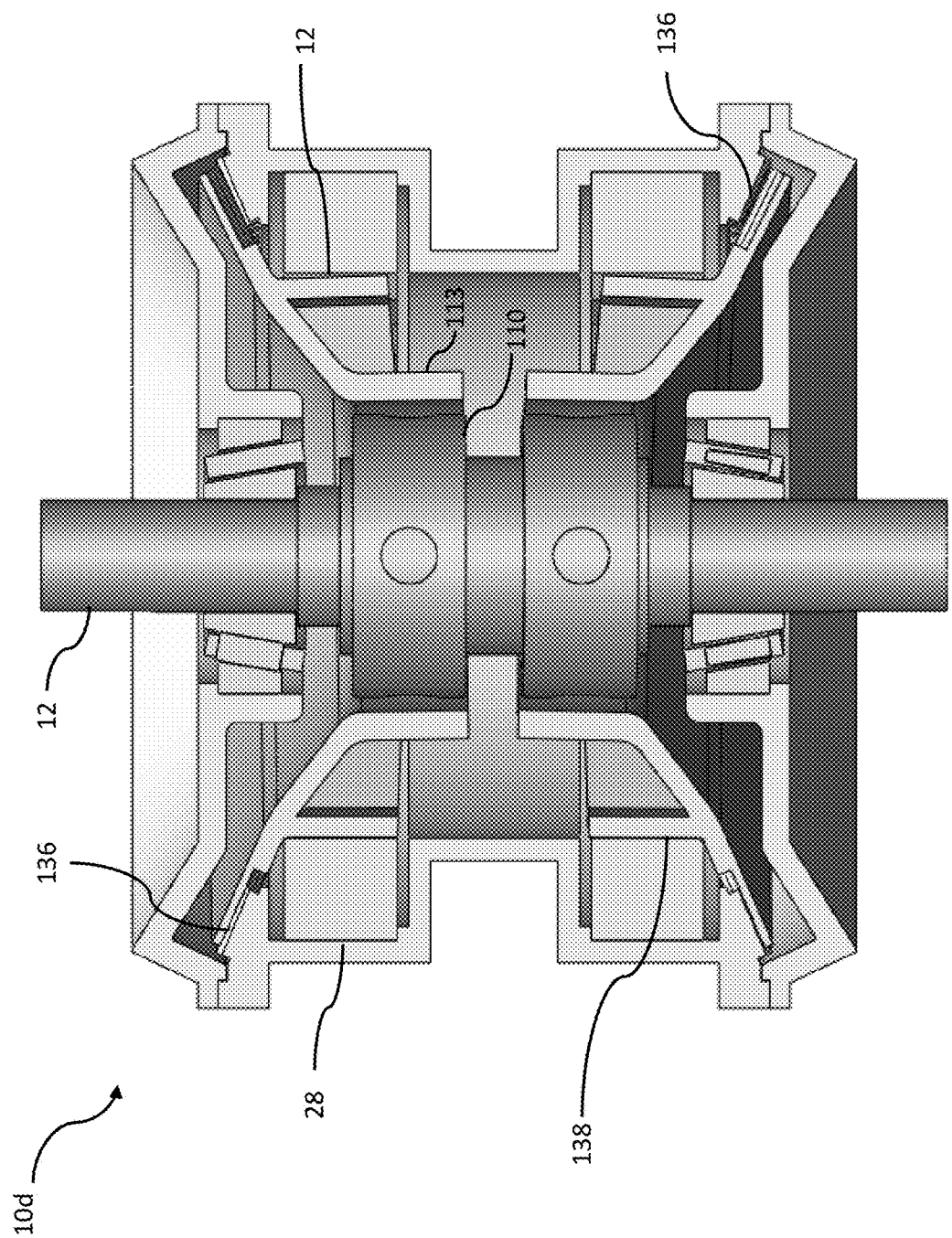
FIGS. 18 and 19 show an electric motor with an outboard traction interface.
Figure 19:
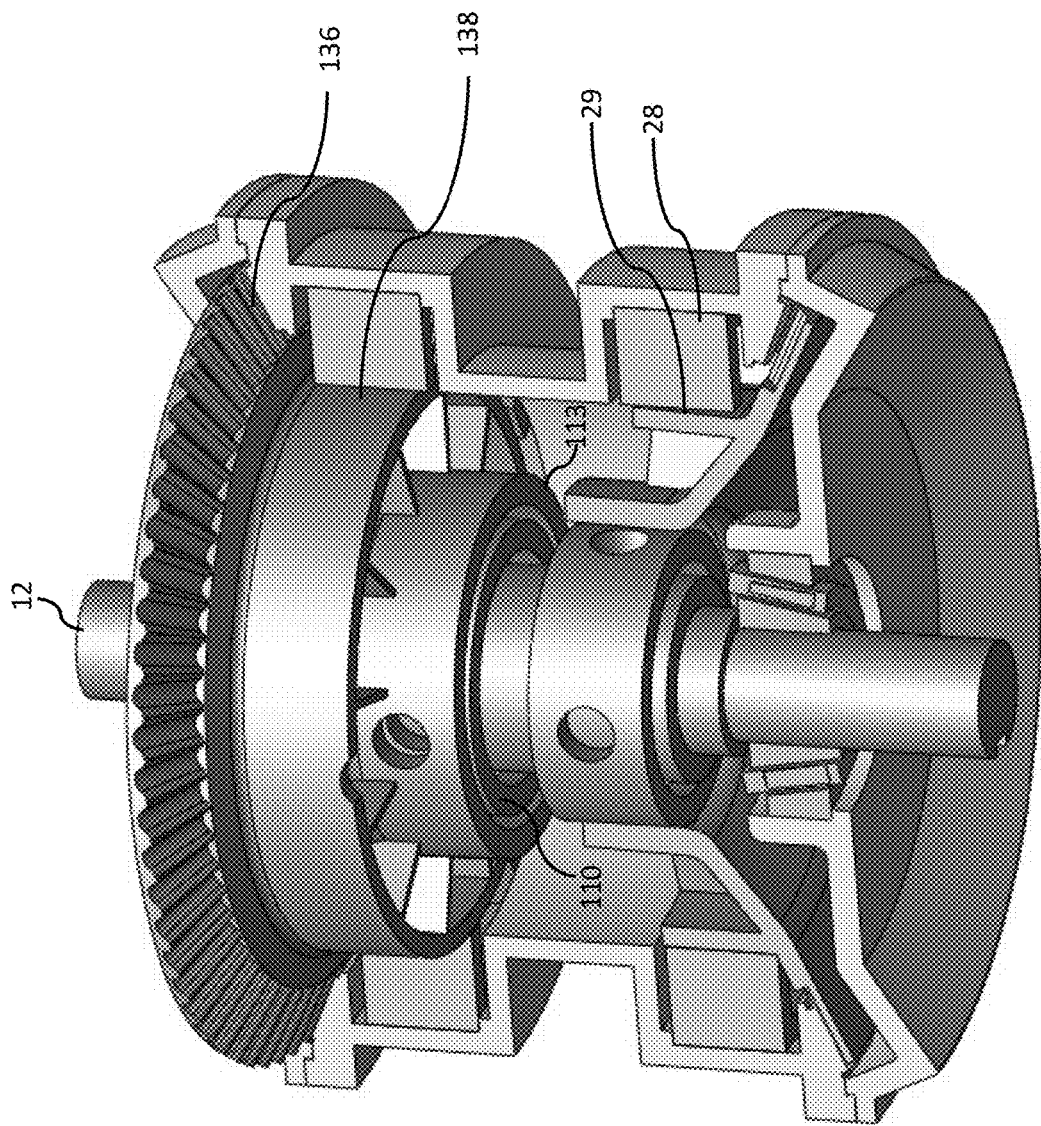

The relative positioning of the rolling traction interfaces and the magnetic interfaces may be varied. In the figures described above, the traction interface is rotationally inboard, and essentially axially outboard, of the magnetic interface. FIGS. 18 and 19 show a motor 10*d* in which the traction interface 136 is radially outboard of the magnetic interface 138 and positioned axially outboard of the stator poles. The progressing engagement point of the traction interface is also aligned with the progressing position of minimum air gap, such that the load path (between torque input and torque output on the rotor) is advantageously short and does not cross the rotor. This may allow the rotor to be designed with lower wall thicknesses and lighter materials, and may make the rotor more resistant to deformation during heavy loading. In addition, this design may provide greater gear contact area, resulting in low gear pressure at the expense of a greater gear pitch velocity for a giving electrical activation frequency.

Figure 20:
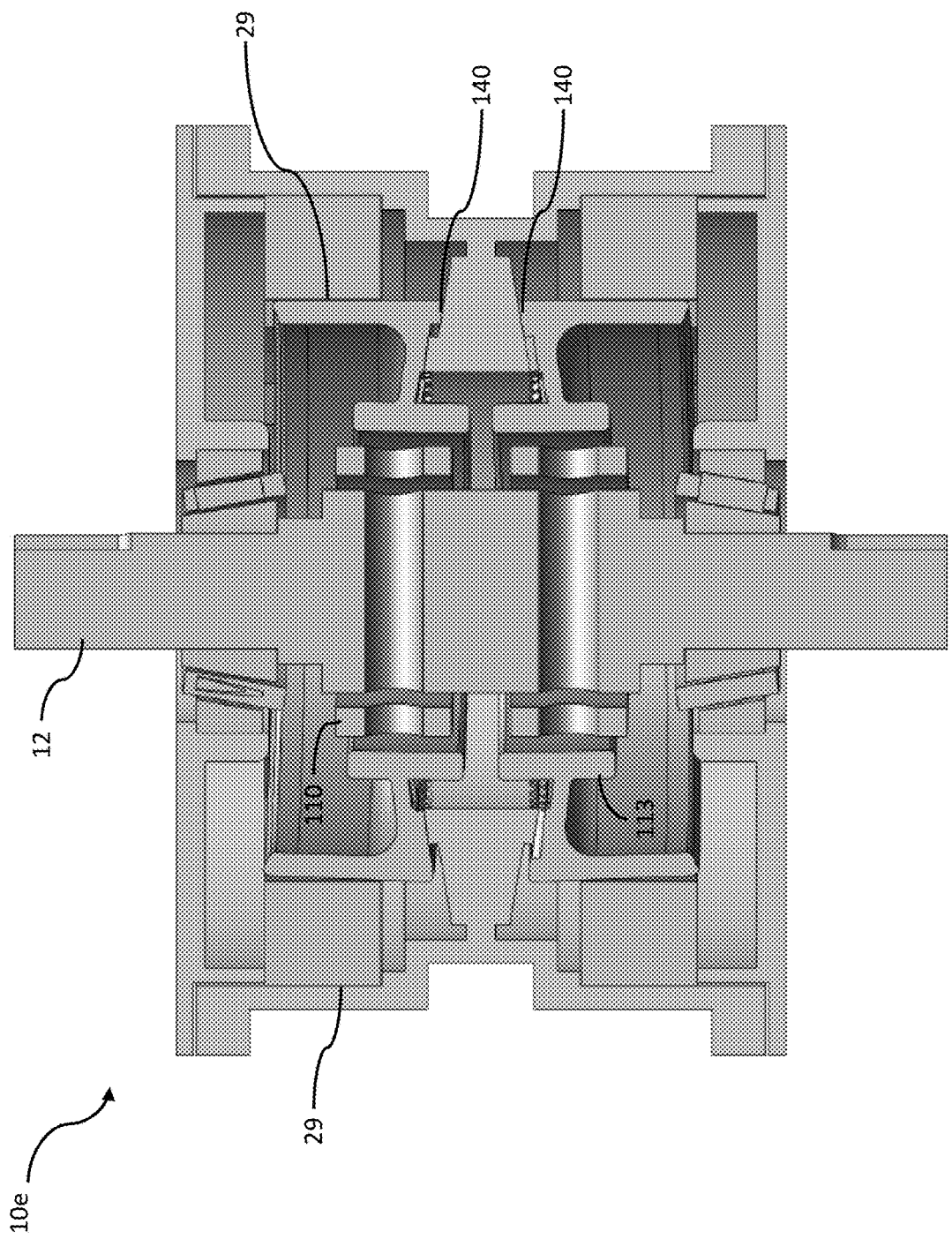
FIGS. 20 and 21 show an electric motor with an inboard traction interface.
Figure 21:
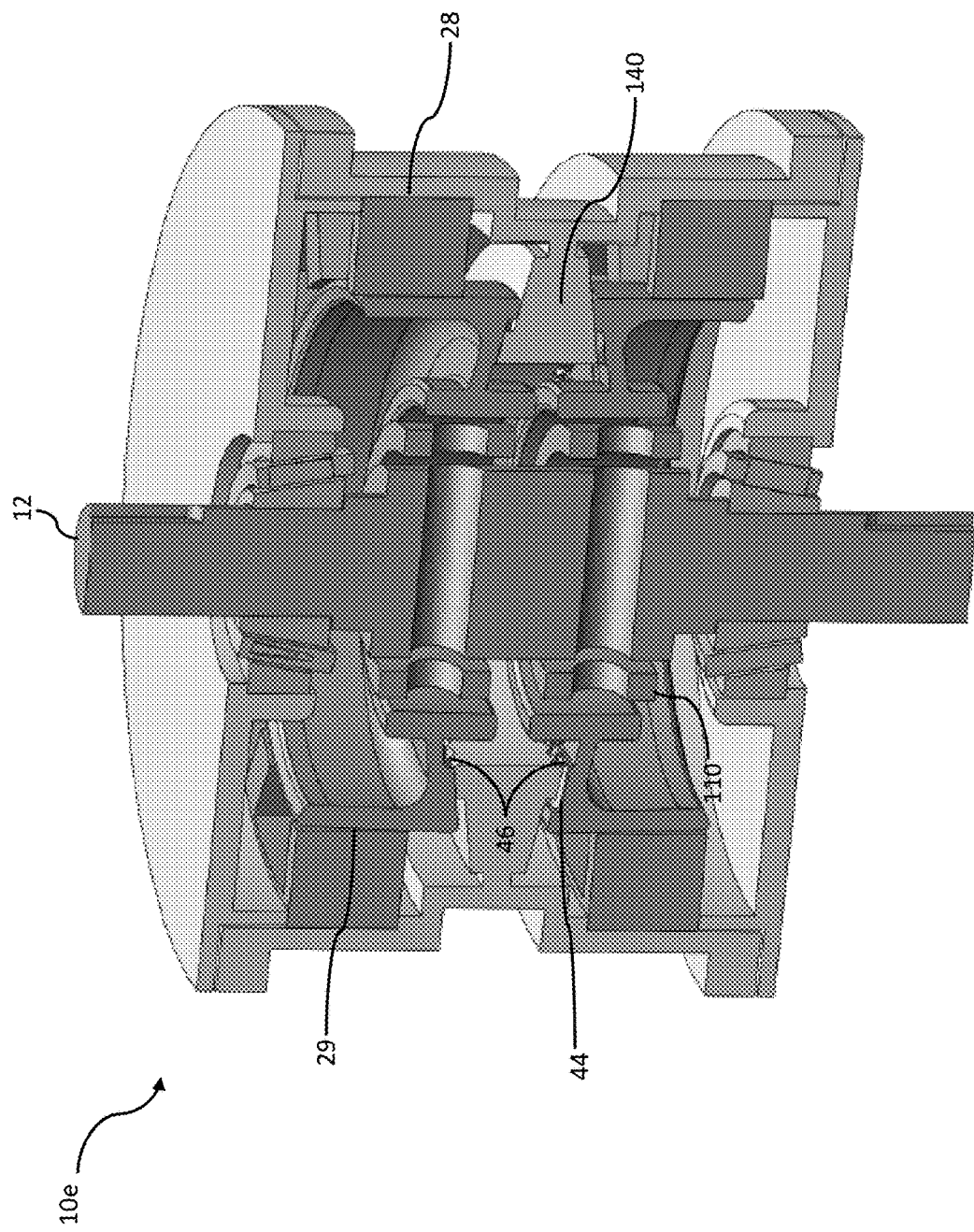

FIGS. 20 and 21 show a motor 10*e* with the stator traction surfaces axially inboard of the motors, on either sides of a traction plate 140 secured to the stator housing at its edge. This design simplifies the structure and processing of the stator end plates. The traction plate may be formed of sintered steel or as a forging. Because the progressing engagement points of the traction interfaces of both rotors are rotationally aligned, any axial component of load applied to the traction plate by one rotor is balanced by a similar load from the other rotor. This design can be especially well-suited to high torque operation, with a short load path with low pitch velocity, and may decrease mechanical redundancy resulting from mounting two separate stator traction plates.

Figure 22:
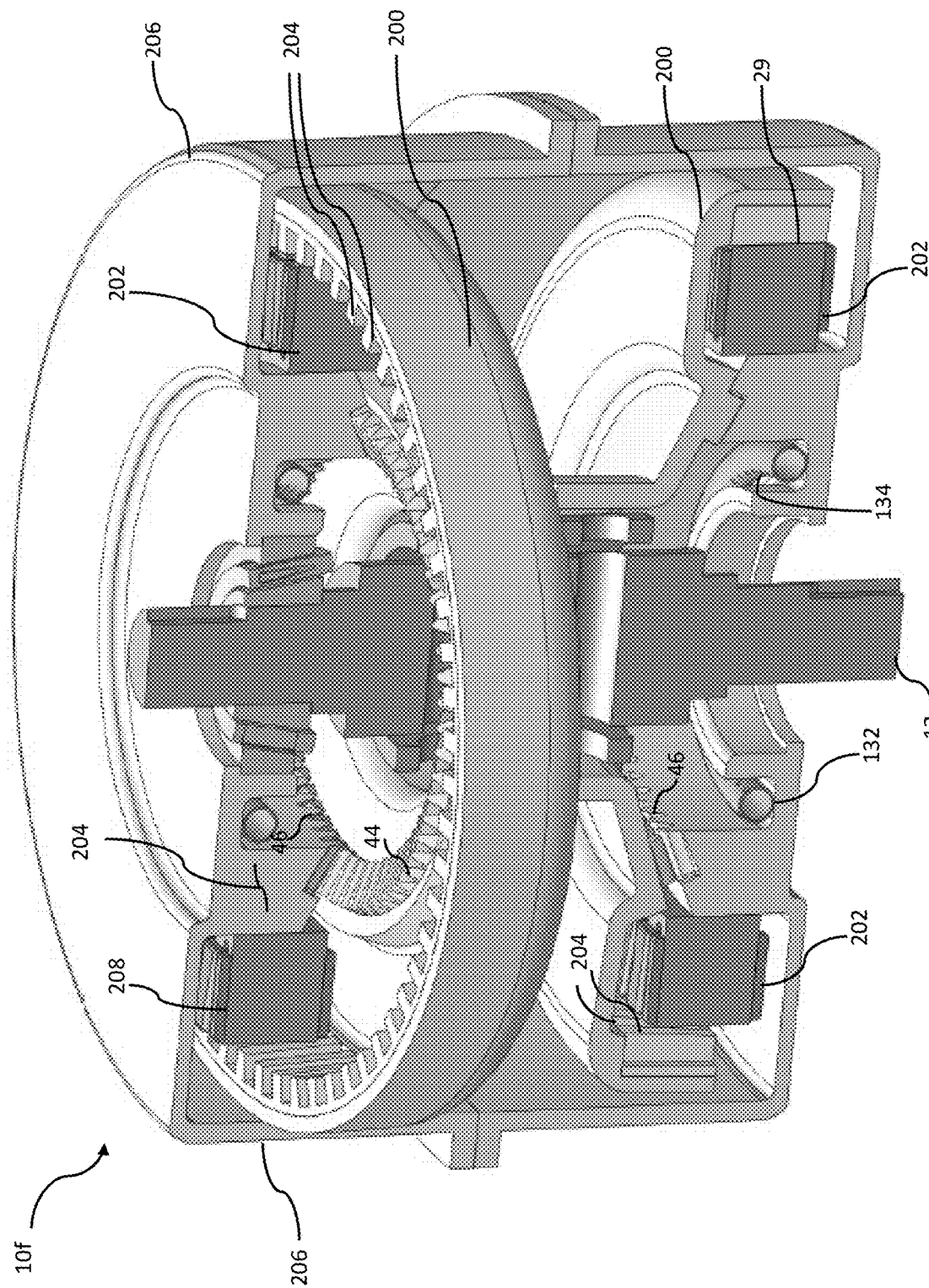
FIGS. 22 and 23 show an external rotor, toothed laminate motor.
Figure 23:
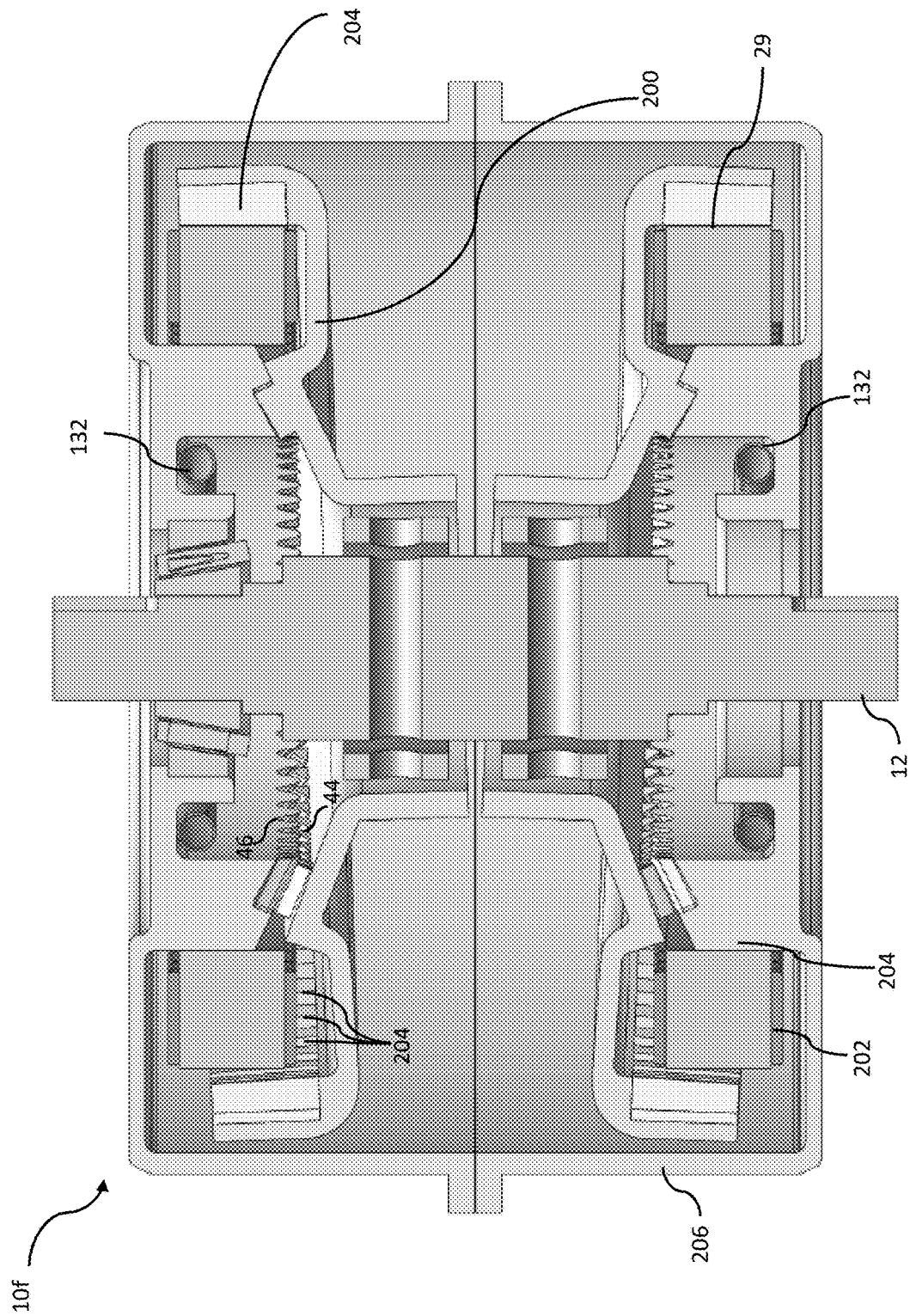

Referring next to FIGS. 22 and 23, motor 10*f* is both an external rotor motor and a toothed laminate motor. By external rotor motor we mean that the radial air gap between each stator and rotor pair is at the radially outer surfaces of the stator poles. Each rotor 200 is cup-shaped and extends around its corresponding stator 202, which is pressed onto an annular boss 204 of a corresponding clamshell housing cup 206. Each housing boss 204 carries the stator teeth 46 that mesh with the rotor teeth 44. The skirt of each rotor carries an array of teeth 204 that extend radially inward toward the poles 208 of the stator to define the active air gap 29. Configuring the active gap surface of the rotor in this way can provide several benefits. Although it may lower the maximum inductance of the magnetic circuit (when the active stator poles are aligned with the adjacent rotor teeth), it also lowers the minimum inductance (when the stator poles 208 are positioned between adjacent rotor teeth 204). As the available work derived from the motor is a function of the difference between maximum and minimum inductance, removing the ferromagnetic material between rotor teeth may not appreciably reduce the work derived from the inductance change. Moreover, it can significantly increase the surface area available to the flux path at the gap 29, as well as removing weight.

Figure 24:
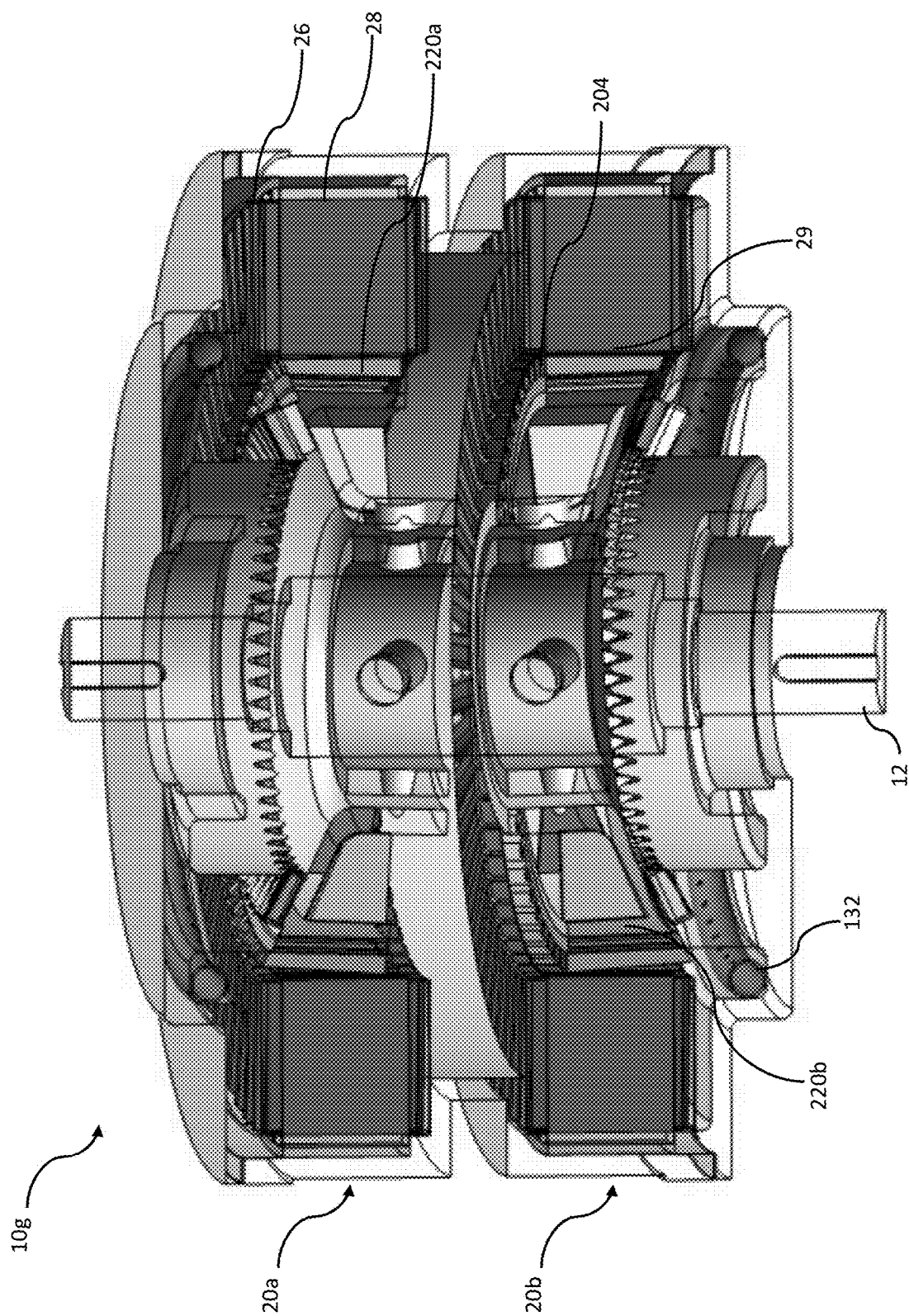
FIG. 24 shows an internal rotor, toothed laminate motor.
Figure 25:
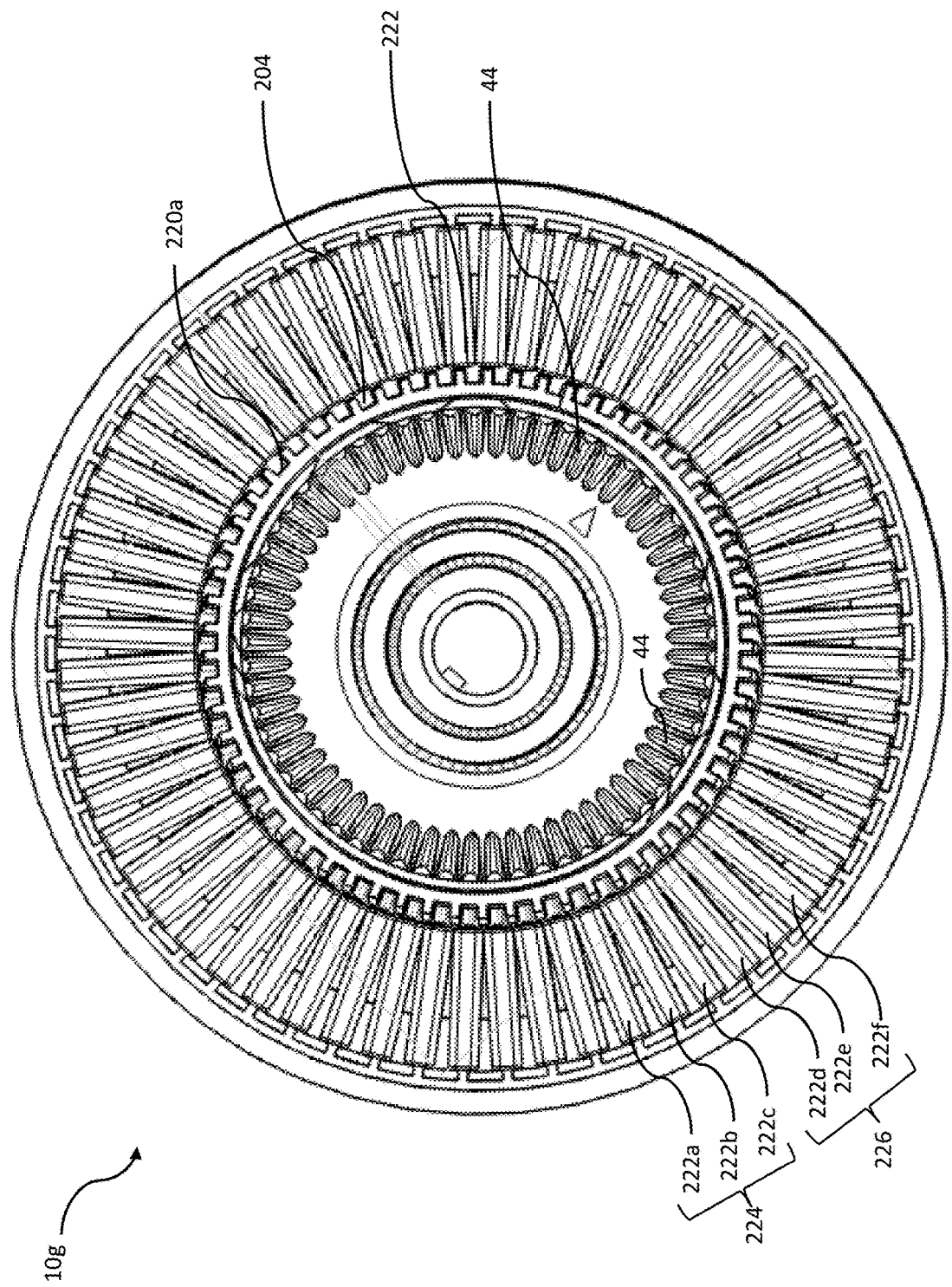
FIG. 25 is a top view of the motor of FIG. 24, with the housing end plate removed.

Motor 10*g* of FIG. 24 also has toothed laminate rotors 220*a* and 220*b*, but is of an internal rotor configuration similar to that of motor 10 of FIG. 7. In this case, the rotor teeth 204 face radially outward to define the air gap 29 with the inner surface of the stator. As shown in FIG. 25, the number of rotor lamination teeth 204 is the same as the number of rotor gear teeth 44, which is one more than the number of stator poles 222. In this example, there are 60 stator poles and 61 lamination teeth, allowing for equal groupings of 2, 3, 4, 5 or even 6 poles.

In any of the above-described motors, sets of adjacent stator poles can be actuated together, and in the same magnetic sense, during motor operation. For example, in the motor 10*g* shown in FIG. 25, the windings around each of poles 220*a*, 220*b* and 220*c* can form one set 224 of windings, all wound in the same direction, and the windings around each of poles 222*d*, 222*e* and 222*f* can together form a second set 226 of windings. In operation, all of the windings of set 224 can be wired in parallel to one electrical switch, and all of the windings of set 226 can be wired in parallel to another electrical switch, such that the poles of set 224 act together and the poles of set 226 act together. Activating multiple adjacent poles simultaneously can also decrease minimum inductance, increasing the available work. Instead of wrapping each pole of a pole set with its own coil, a single coil can be wrapped about all of the poles of a given set. Of course, when coupling multiple stator poles together as an operative unit the total number of stator poles should be an integer multiple of the number of poles in each set.

Figure 26:
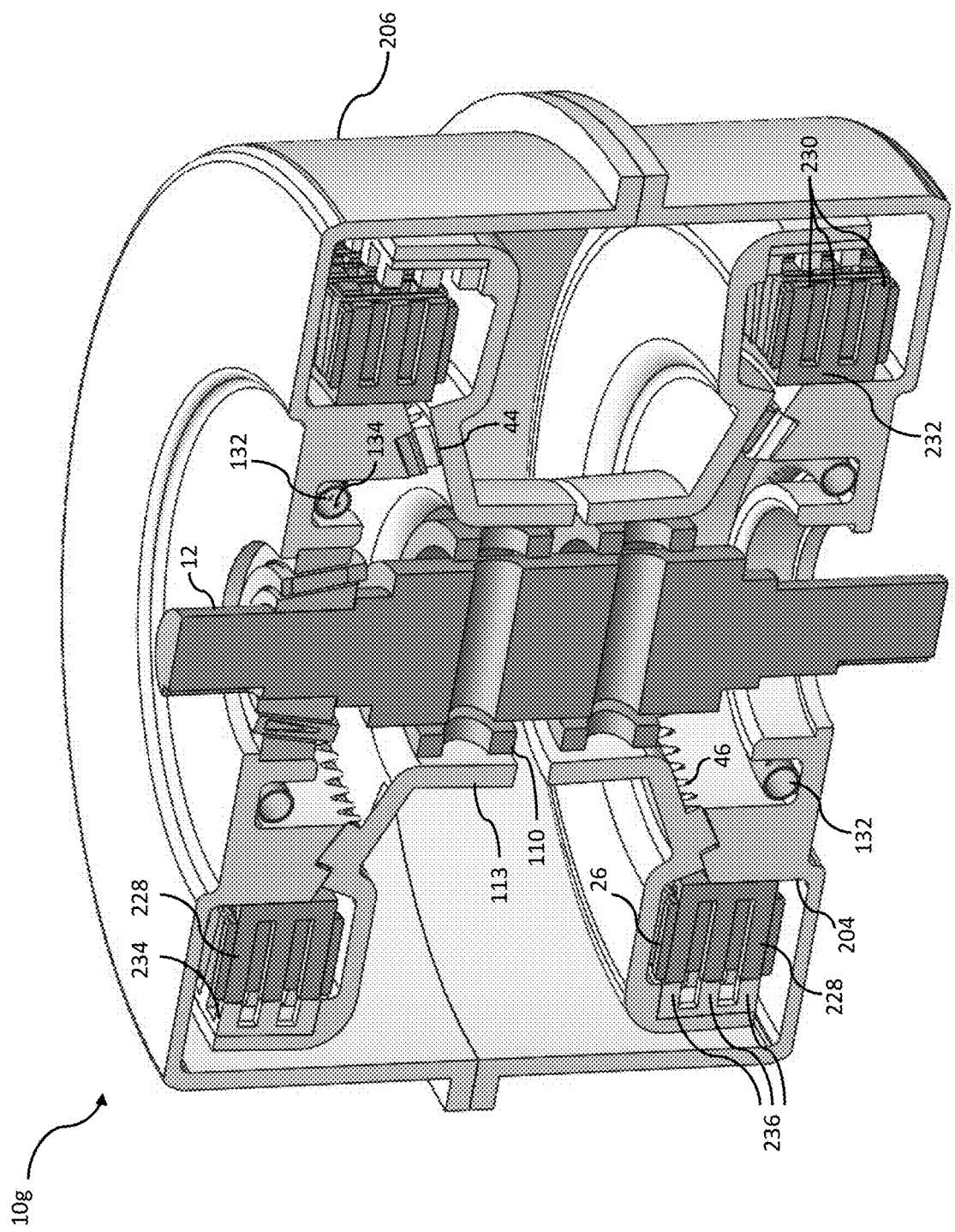
FIG. 26 shows an external rotor, segmented tooth laminate motor.

The maximum change of inductance during the operational cycle of the motor can also be effected by other structural changes, to take additional advantage of the effective relative motion of the gap structures in the axial dimension. Motor 10h of FIG. 26 is similar to the motor 10f of FIG. 22, except that each stator pole 228 has been segmented to form three pole projections 230 that are spaced apart in the axial direction and connected by a common spine 232. Similarly, each rotor tooth 234 is segmented to form three tooth projections 236 spaced apart in the axial direction. In the minimum gap position (the left of the figure), the pole projections are axially aligned with the tooth projections. In the maximum gap position (the right of the figure), the tooth projections are generally a maximum misalignment with the pole projections, which greatly reduces the inductance. While this example has three tooth projections and three pole projections, with axial spaces between the tooth projections and between the pole projections that are essentially the same axial dimension as the middle tooth projection and the middle pole projection, other examples with two or four or more projections of each rotor tooth and each pole projection are envisioned. Preferably, the number of projections of each pole equal the number of projections of each laminate tooth.

Figure 27:
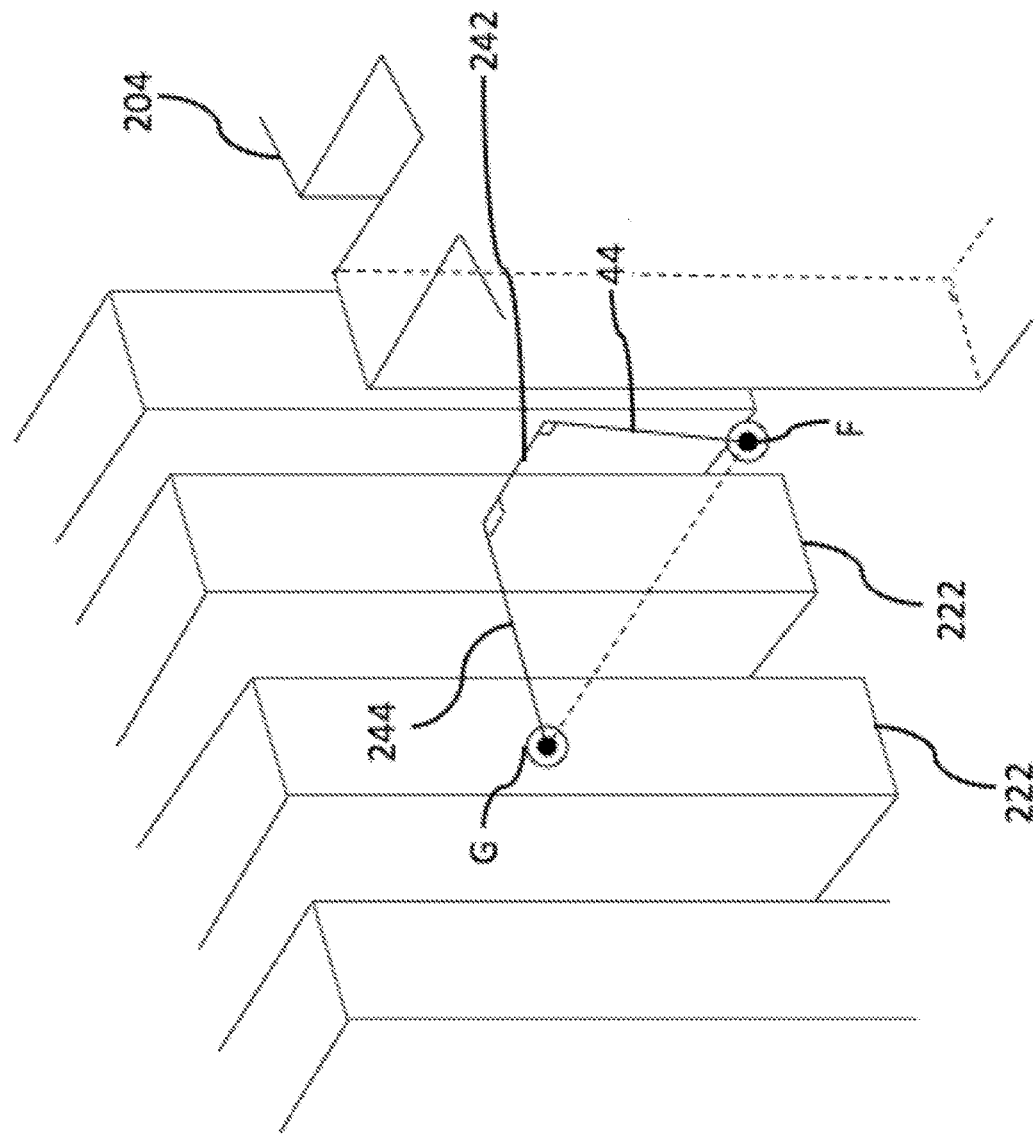
FIG. 27 illustrates relative rotor/stator air gap surface motion in three dimensions.

The split pole/tooth configuration of FIG. 26 helps to take advantage of the fact that with a nutating rotor motor the distance traveled by rotor structure bounding the magnetic gap, with respect to the stator structure bounding the magnetic cap, is greater than just the radial displacement caused by the nutation. Referring to FIG. 27, point 'F' represents a reference point of a rotor tooth 204 at a minimum gap position of the rotor, and point 'G' represents the same point of the rotor tooth at the subsequent maximum gap position of the rotor (i.e., after half of a nutation cycle). The length of segment FG represents the total distance traveled during the half-cycle, and is a compilation of the axial displacement 240, the radial displacement 242, and the tangential displacement 244. The axial segmenting of the rotor teeth and poles helps to take advantage of the axial displacement 240 of the rotor tooth during nutation.

Any of the above-described motors can be controlled to generate electrical energy from dynamic energy (such as for regeneratively braking the motor). This may be accomplished by altering the timing of the compression wave such that stator current is pulsed at the point of minimum air gap (or even slightly lagging the point of minimum air gap) to generate forward EMF during expansion. In this manner, electrical current can be generated and directed to storage in an associated battery while a deceleration torque is applied to the rotor to slow the motor, even though the motor is not mechanically backdrivable by torque applied to the output shaft.

Ferromagnetic lubricants, such as ferro-fluids, ferromagnetic surface coatings, such as cobalt plating, or surface treatments, such as boriding, that may produce ferromagnetic compounds may be used to decrease rolling friction and increase surface hardness. Hard ferromagnetic coatings may also support low surface roughness, mechanical polishing and lower relatively frictional operation. These materials may be coated or added to the system using conventional methods.

Other technical details of motor design are described in pending patent application Ser. No. 15/549,659, filed on Aug. 8, 2017 and entitled "High Torque Density Electric Motor and/or Generator," the contents of which are expressly incorporated herein by reference as if set forth in their entirety.

While a number of examples have been described for illustration purposes, the foregoing description is not intended to limit the scope of the invention, which is defined by the scope of the appended claims. There are and will be other examples and modifications within the scope of the following claims.

What is claimed is:
1. An electric motor comprising:
an output shaft defining an axis of rotation;
a first nutating rotor coupled to the output shaft at a first tiltable connection;
a first stator disposed adjacent the first nutating rotor to define a first dynamic air gap, wherein the first dynamic air gap is bounded by a first outer circumferential surface of the first nutating rotor, such that magnetic coupling between the first nutating rotor and the first stator is principally radial;
a second nutating rotor coupled to the output shaft at a second tiltable connection; and
a second stator disposed adjacent the second nutating rotor to define a second dynamic air gap, wherein the second dynamic air gap is bounded by a second outer circumferential surface of the second nutating rotor, such that magnetic coupling between the second nutating rotor and the second stator is principally radial,
wherein the first stator comprises first multiple coils each configured to generate a first magnetic field to draw a respective side of the first nutating rotor toward the first stator, to cause the first nutating rotor to nutate with respect to the first stator about the axis of rotation of the output shaft in response to sequential activations of the first multiple coils, progressively tilting the first tiltable connection,
wherein the second stator comprises second multiple coils each configured to generate a second magnetic field to draw a respective side of the second nutating rotor toward the second stator, to cause the second nutating rotor to nutate with respect to the second stator about the axis of rotation of the output shaft in response to sequential activations of the second multiple coils, progressively tilting the second tiltable connection, and
wherein the sequential activations of the first multiple coils of the first stator and the sequential activations of the second multiple coils of the second stator are configured to cause the first nutating rotor and the second nutating rotor to transfer a cumulative torque to turn the output shaft.
2. The electric motor of claim 1, wherein:
the first stator is mechanically coupled to the first nutating rotor by a first nutating traction interface such that during nutation of the first nutating rotor with respect to the first stator a first tilt axis of the first nutating rotor progresses about the axis of rotation of the output shaft, wherein the first nutating traction interface comprises a series of first rotor gear teeth configured to axially mesh with a series of first stator gear teeth at a first engagement point, and
the second stator is mechanically coupled to the second nutating rotor by a second nutating traction interface such that during nutation of the second nutating rotor with respect to the second stator a second tilt axis of the second nutating rotor progresses about the axis of rotation of the output shaft, wherein the second nutating traction interface comprises a series of second rotor gear teeth configured to axially mesh with a series of second stator gear teeth at a second engagement point.
3. The electric motor of claim 2, wherein the output shaft defines a lubrication port arranged to direct a flowable lubricant to at least one of the first nutating traction interface or the second nutating traction interface during motor operation.

4. The electric motor of claim 2, further comprising an active lubrication system including a pump that causes a flow of lubricant to be directed to at least one of the first nutating traction interface or the second nutating traction interface during motor operation.

5. The electric motor of claim 2, wherein the first nutating traction interface and the first dynamic air gap are arranged such that, in a first plane containing the axis of rotation of the output shaft, the first nutating traction interface is angled with respect to a stator surface of the first stator bounding the first dynamic air gap, and
wherein the second nutating traction interface and the second dynamic air gap are arranged such that, in a second plane containing the axis of rotation of the output shaft, the second nutating traction interface is angled with respect to a stator surface of the second stator bounding the second dynamic air gap.

6. The electric motor of claim 2, wherein the series of first rotor gear teeth comprises more gear teeth than the series of first stator gear teeth, or
wherein there is a difference of one tooth between total numbers of gear teeth of the series of first rotor gear teeth and the series of first stator gear teeth, such that one nutation of the first nutating traction interface changes a rotational position of the first nutating rotor with respect to the first stator by a circumferential pitch of one tooth spacing.

7. The electric motor of claim 2, wherein the first nutating rotor and the second nutating rotor are coupled to the output shaft such that, during motor operation, the first tilt axis of the first nutating rotor and the second tilt axis of the second nutating rotor tilt in opposite directions with respect to the axis of rotation of the output shaft.

8. The electric motor of claim 2, wherein a progressing first engagement point of the first nutating traction interface is rotationally aligned with a progressing second engagement point of the second nutating traction interface during motor operation.

9. The electric motor of claim 2, wherein the first nutating rotor and the second nutating rotor are disposed axially between the first nutating traction interface and the second nutating traction interface, or
wherein the first nutating traction interface and the second nutating traction interface are disposed between the first nutating rotor and the second nutating rotor.

10. The electric motor of claim 2, wherein the first nutating traction interface comprises a tapered edge surface of the first nutating rotor arranged to roll against a tapered stop surface of the first stator during nutation.

11. The electric motor of claim 1, wherein the first nutating rotor comprises radially-extending, circumferentially spaced-apart teeth with distal end surfaces that bound the first dynamic air gap, and
wherein the first stator comprises circumferentially spaced-apart poles associated with stator windings.

12. The electric motor of claim 1, wherein each of the first nutating rotor and the second nutating rotor is rotationally coupled to the output shaft by a respective gimbal.

13. The electric motor of claim 1, wherein the first nutating rotor is disposed within the first stator, and the second nutating rotor is disposed within the second stator.

14. The electric motor of claim 1, wherein the first multiple coils of the first nutating rotor comprises:
a first coil disposed adjacent the first nutating rotor to define the first dynamic air gap,
a second coil spaced circumferentially from the first coil, and
a third coil spaced circumferentially from both the first coil and the second coil, with the second coil disposed between the first coil and the third coil,
wherein the sequential activations of the first multiple coils comprise activations of the first coil, the second coil, and the third coil in order.

15. The electric motor of claim 1, wherein sequentially activated coils of the first stator and sequentially activated coils of the second stator together form simultaneously-activated pairs of coils, each pair featuring both a coil of the first stator and a coil of the second stator circumferentially aligned with the coil of the first stator.

16. An electric motor comprising:
an output shaft defining an axis of rotation;
a nutating rotor rotationally coupled to the output shaft; and
a stator mechanically coupled to the nutating rotor by a nutating traction interface, such that during nutation of the nutating rotor with respect to the stator a tilt axis of the nutating rotor progresses about the axis of rotation of the output shaft,
wherein the nutating rotor and a surface of the stator bound a radial dynamic air gap across which a magnetic field is produced by electrical activation of the electric motor to generate a force between the nutating rotor and the stator,
wherein the nutating traction interface and the radial dynamic air gap are arranged such that, in a plane containing the axis of rotation of the output shaft, the nutating traction interface is angled with respect to the stator surface bounding the radial dynamic air gap, and
wherein the output shaft defines a lubrication port arranged to direct a flowable lubricant to the nutating traction interface.

17. The electric motor of claim 16, further comprising:
an active lubrication system including a pump that causes a flow of lubricant to be directed to the nutating traction interface during motor operation,
wherein the lubrication port is in fluid communication with a lubrication channel defined by a gimbal on which the nutating rotor is mounted.

18. A method comprising:
providing an electric motor that comprises:
an output shaft defining an axis of rotation,
a first nutating rotor rotationally coupled to the output shaft, and a first stator mechanically coupled to the rotor by a first nutating traction interface, wherein the first rotor and a surface of the first stator bound a first radial dynamic air gap, and
a second nutating rotor rotationally coupled to the output shaft, and a second stator mechanically coupled to the rotor by a first nutating traction interface, wherein the second rotor and a surface of the second stator bound a second radial dynamic air gap,
wherein the first nutating traction interface and the first radial dynamic air gap are arranged such that, in a first plane containing the axis of rotation of the output shaft, the first nutating traction interface is angled with respect to the surface of the first stator bounding the first radial dynamic air gap, and
wherein the second nutating traction interface and the second radial dynamic air gap are arranged such that, in a second plane containing the axis of rotation of the output shaft, the second nutating traction interface is angled with respect to the surface of the second stator bounding the second radial dynamic air gap; and operating the electric motor by
- activating the first stator to nutate the first nutating rotor with respect to the first stator to produce a first magnetic field across the first radial dynamic air gap to thereby generate a first force between the first nutating rotor and the first stator to turn the output shaft, a first tilt axis of the first rotor progressing to define a first conical surface with respect to the axis of rotation of the output shaft, and
- activating the second stator to nutate the second nutating rotor with respect to the second stator to produce a second magnetic field across the second radial dynamic air gap to thereby generate a second force between the second nutating rotor and the second stator to turn the output shaft, a second tilt axis of the second rotor progressing to define a second conical surface with respect to the axis of rotation of the output shaft.

19. The method of claim 18, wherein a progressing engagement point of the first nutating traction interface is rotationally aligned with a progressing engagement point of the second nutating traction interface during the operating of the electric motor.

20. The method of claim 18, wherein operating the electric motor comprises:
- sequential activating first multiple coils of the first stator and sequential activating second multiple coils of the second stator to cause the first nutating rotor and the second nutating rotor to transfer a cumulative torque to turn the output shaft.

* * * * *